United States Patent
Wilber

[11] Patent Number: 5,905,780
[45] Date of Patent: *May 18, 1999

[54] ELECTRONIC MAIL SYSTEM

[75] Inventor: James G. Wilber, Lowell, Mass.

[73] Assignee: Dynaflo Systems Inc., Lowell, Mass.

[*] Notice: This patent is subject to a terminal disclaimer.

[21] Appl. No.: 08/280,011

[22] Filed: Jul. 25, 1994

Related U.S. Application Data

[63] Continuation-in-part of application No. 07/773,371, Oct. 8, 1991, abandoned.

[51] Int. Cl.[6] .................................................. H04M 11/00
[52] U.S. Cl. .................................. 379/93.02; 379/93.24; 379/93.28; 379/102.02; 379/93.26; 379/93.31; 379/102.04
[58] Field of Search ................................ 379/98, 95, 97, 379/102, 104, 105, 373, 93, 93.01, 93.02, 93.08, 93.17, 93.24, 93.26, 93.28, 93.31, 102.01, 102.02, 102.03, 102.04

[56] References Cited

U.S. PATENT DOCUMENTS

| | | |
|---|---|---|
| 4,546,213 | 10/1985 | Dick .......................................... 379/95 |
| 4,621,334 | 11/1986 | Garcia . |
| 4,686,699 | 8/1987 | Wilkie . |
| 4,748,654 | 5/1988 | Gray . |
| 4,763,351 | 8/1988 | Lipscher et al. . |
| 4,841,561 | 6/1989 | Hill . |
| 4,959,853 | 9/1990 | Del Monte et al. . |
| 4,974,253 | 11/1990 | Hashimoto ............................. 379/102 |
| 4,998,273 | 3/1991 | Nichols . |
| 5,008,926 | 4/1991 | Misholi . |
| 5,063,593 | 11/1991 | Kwon . |
| 5,070,523 | 12/1991 | Hafer et al. . |
| 5,333,152 | 7/1994 | Wilber ...................................... 379/95 |
| 5,440,617 | 8/1995 | Rynaski et al. .......................... 379/95 |

OTHER PUBLICATIONS

M. Erickson, "Introduction to the CCITT T.30 Specification", p. 8, Feb. 1990.

*Primary Examiner*—Stella Woo
*Attorney, Agent, or Firm*—Stephen G. Matzuk

[57] ABSTRACT

Apparatus and method providing improvements in establishing a data path between local and selected remote equipment over non-dedicated telephone lines. The present invention provides for the detecting of signalling activity during period not normally monitored, to provide a system which is resistant to accidental interruptions during the initial establishment of the data path, and includes apparatus, such as an external programmable code repeater insertable between the calling computer and the telephone line to overcome limitations of typical modems and modem software. Also included are further features offering greater flexibility in applications and permitting further compatibility with differing or more limited hardware and software systems.

17 Claims, 22 Drawing Sheets

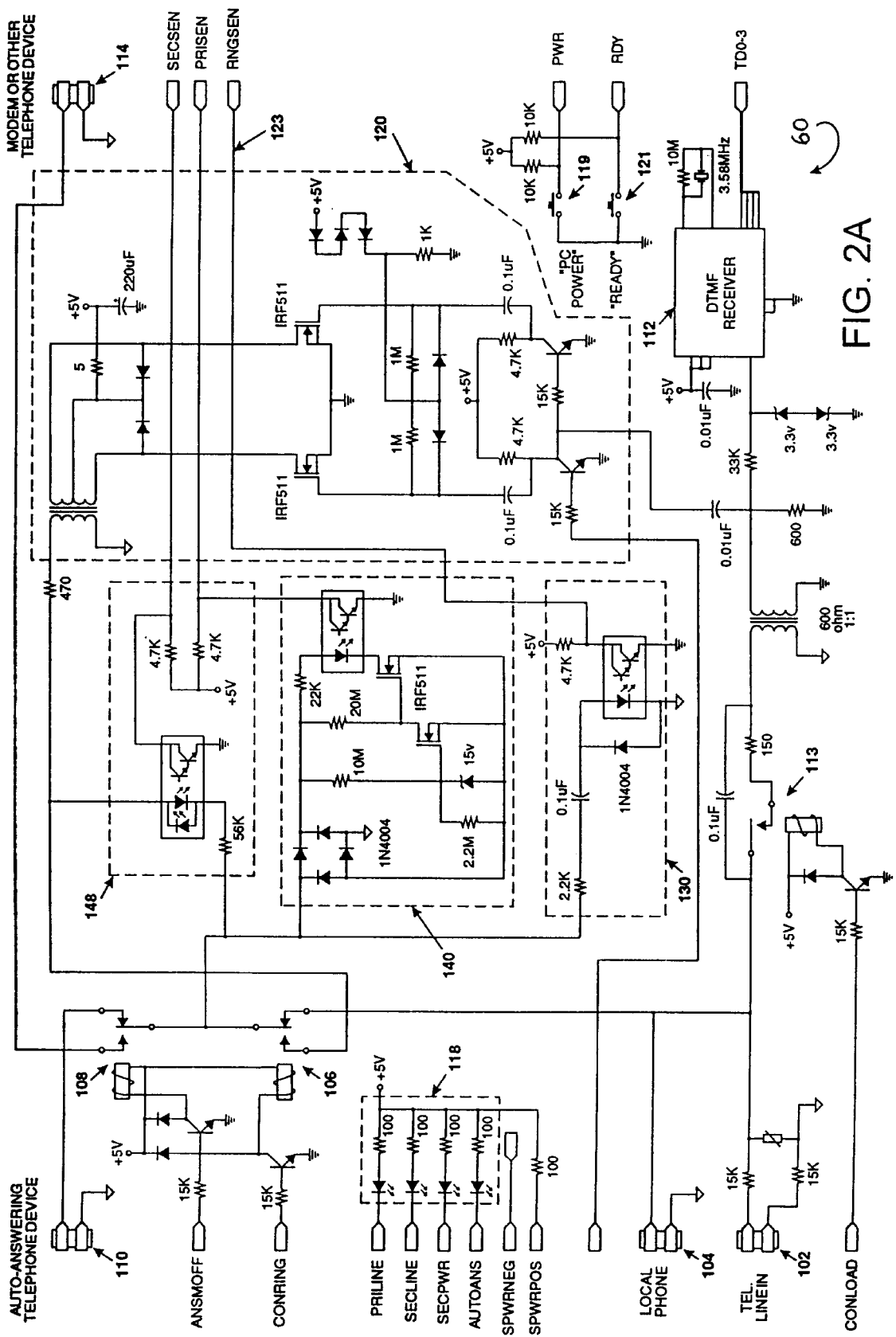

MAIN PROCESSING LOOP

FIG. 6 PROCESS "LINE RINGING"

FIG. 8  PROCESS "INTERACTIVE TOUCH-TONE PASSWORD"

FIG. 10A  PROCESS "MODEM OFFHOOK"
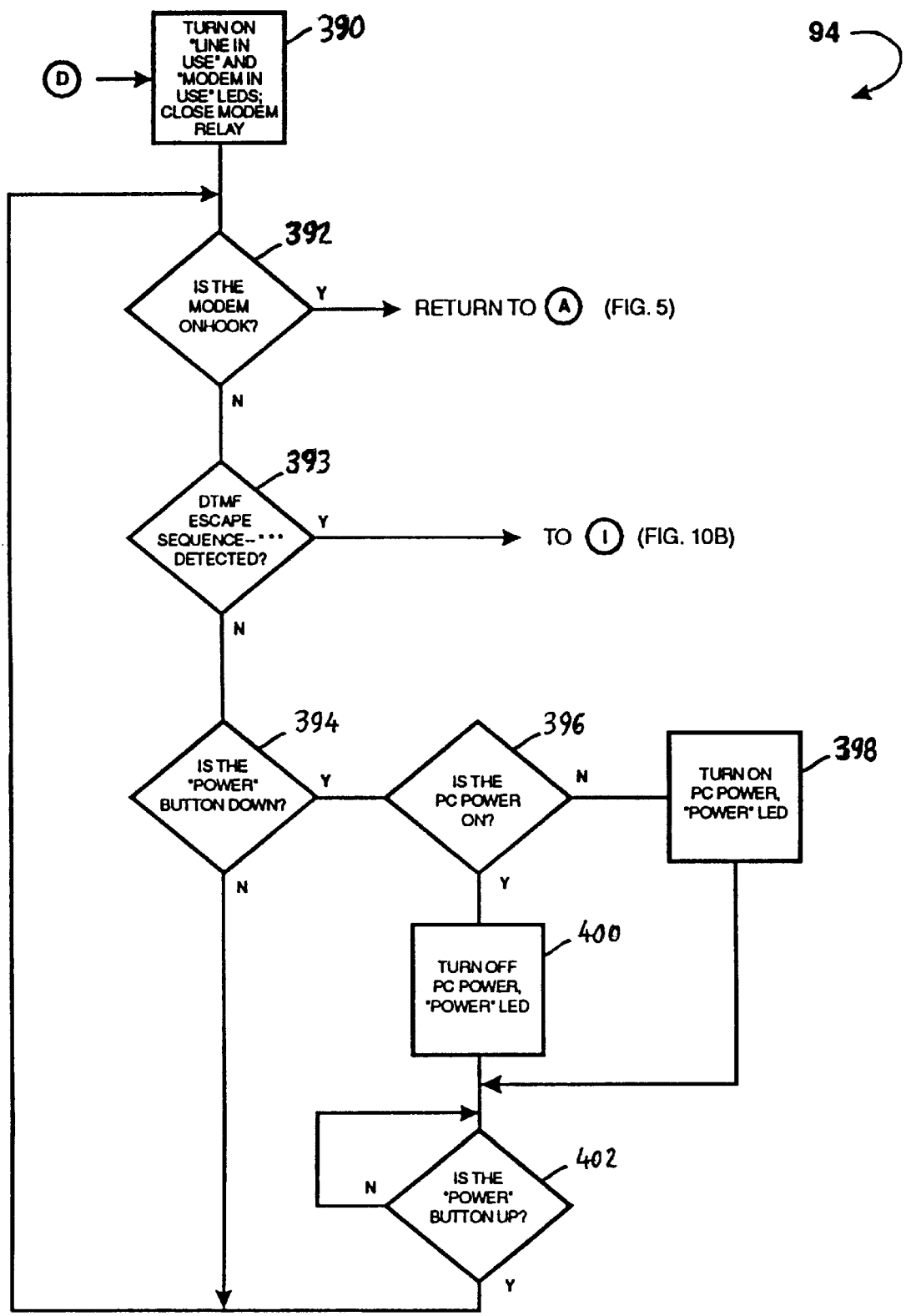

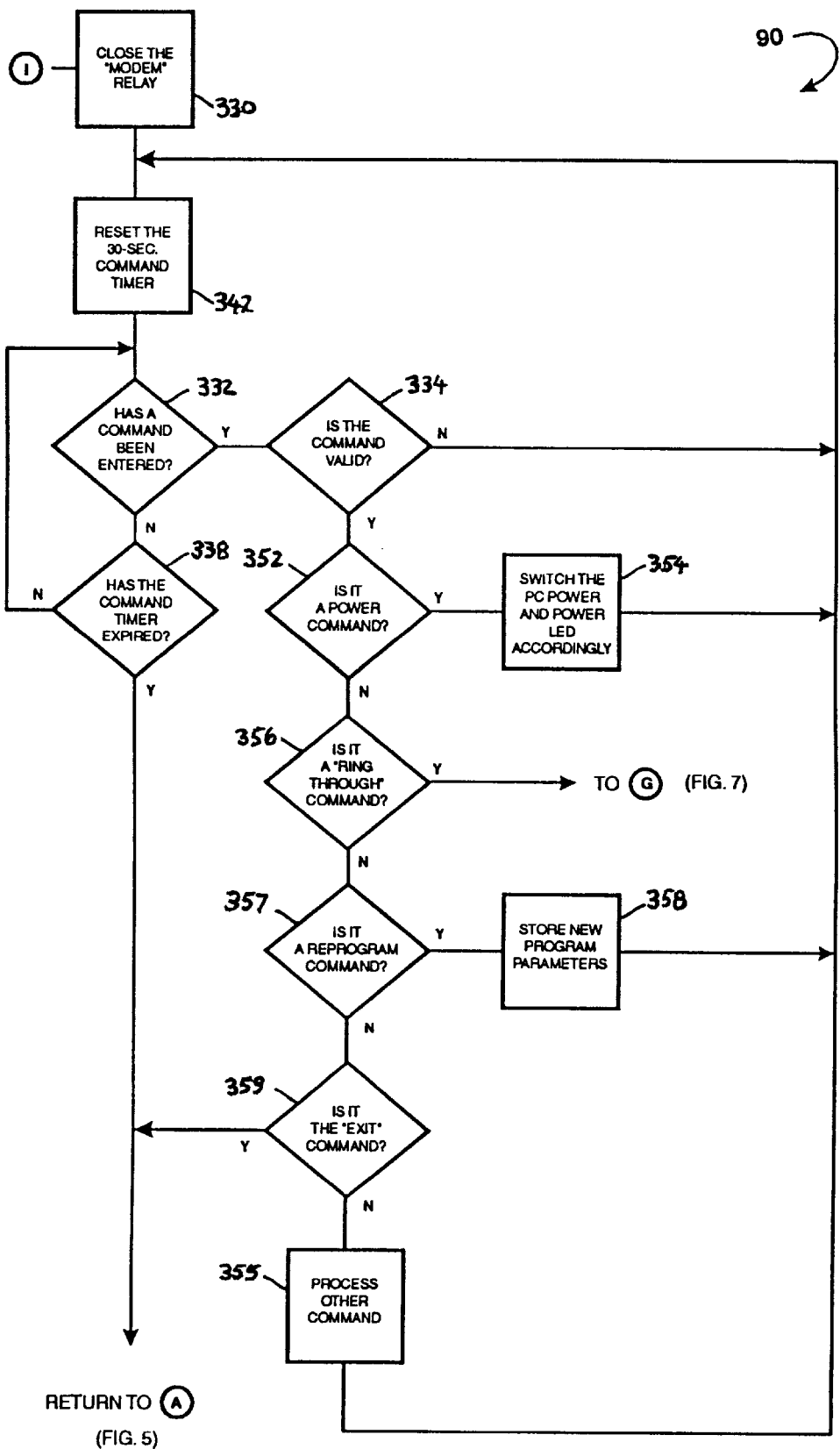
FIG. 10B PROCESS "MODEM BATCH COMMANDS"

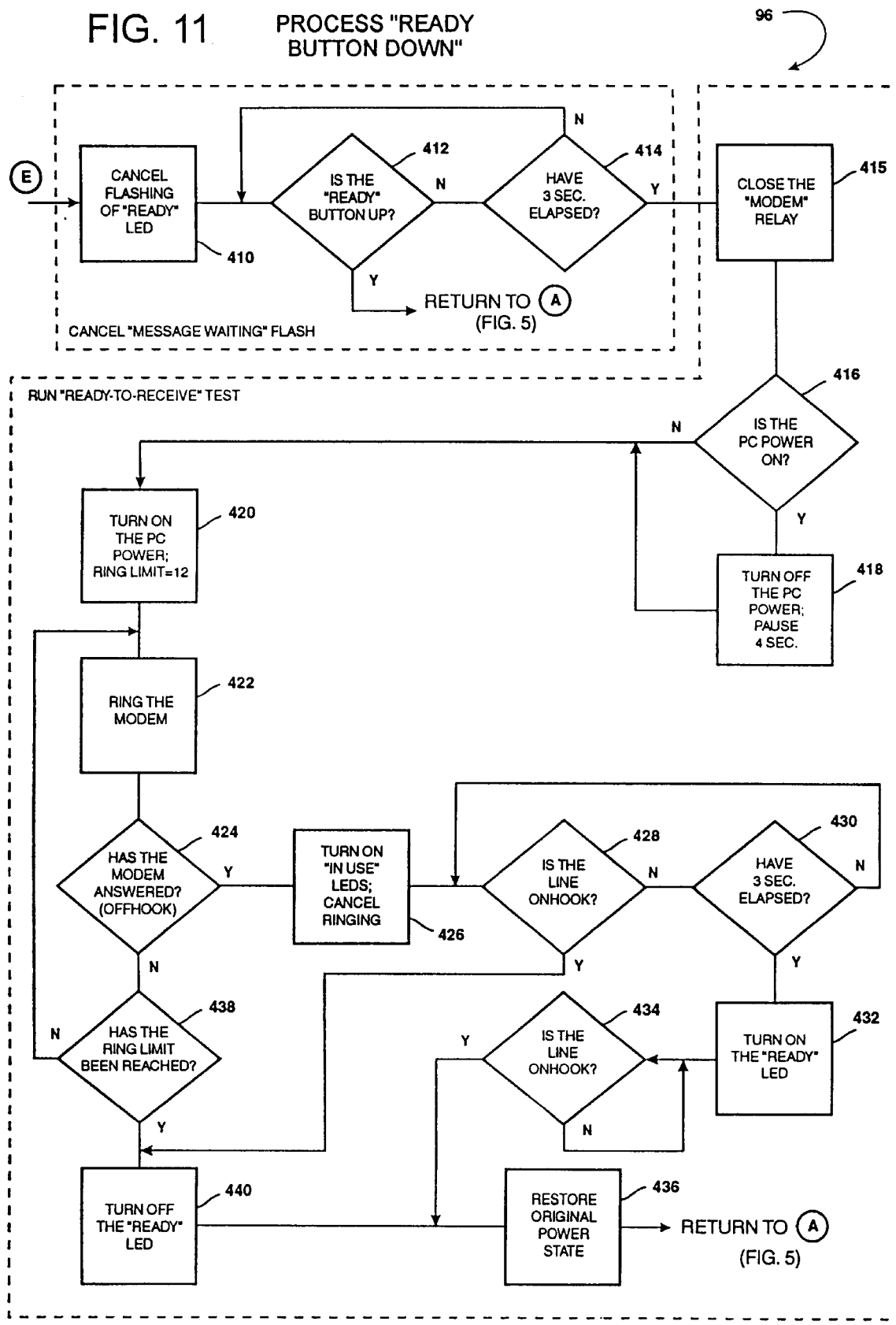

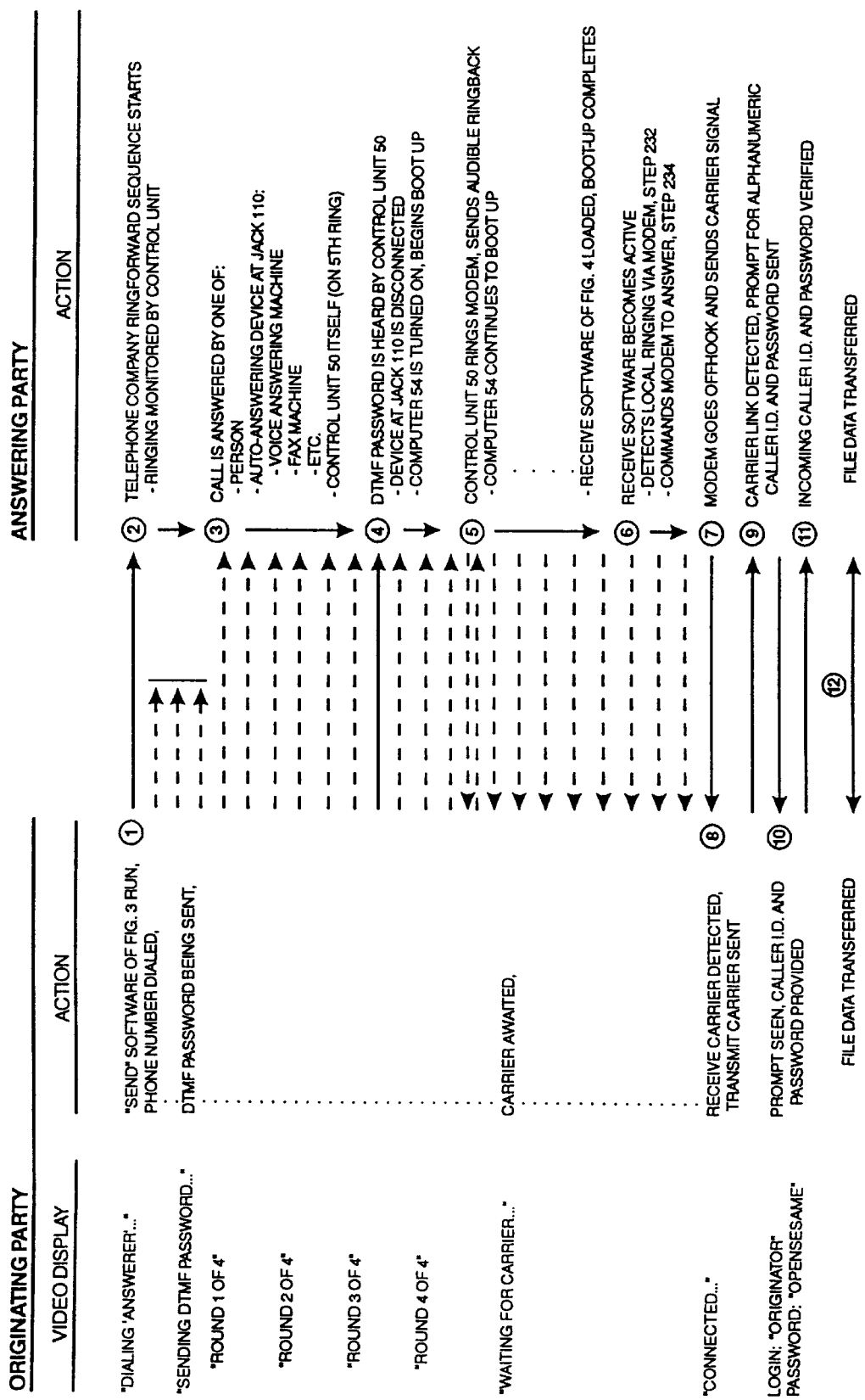

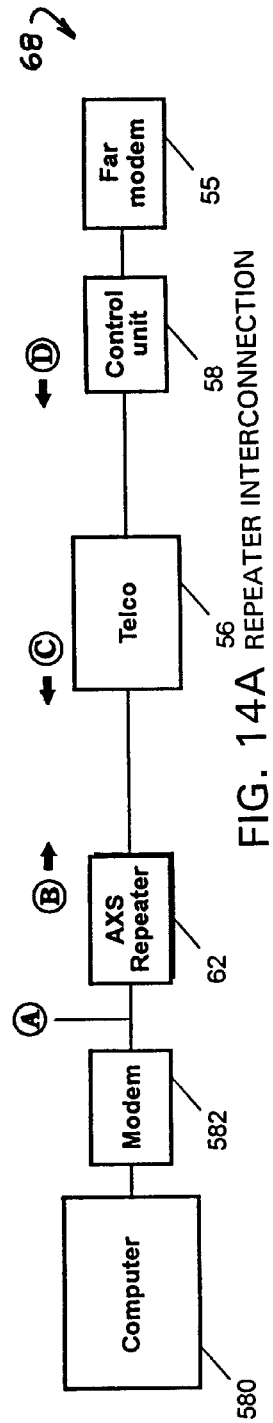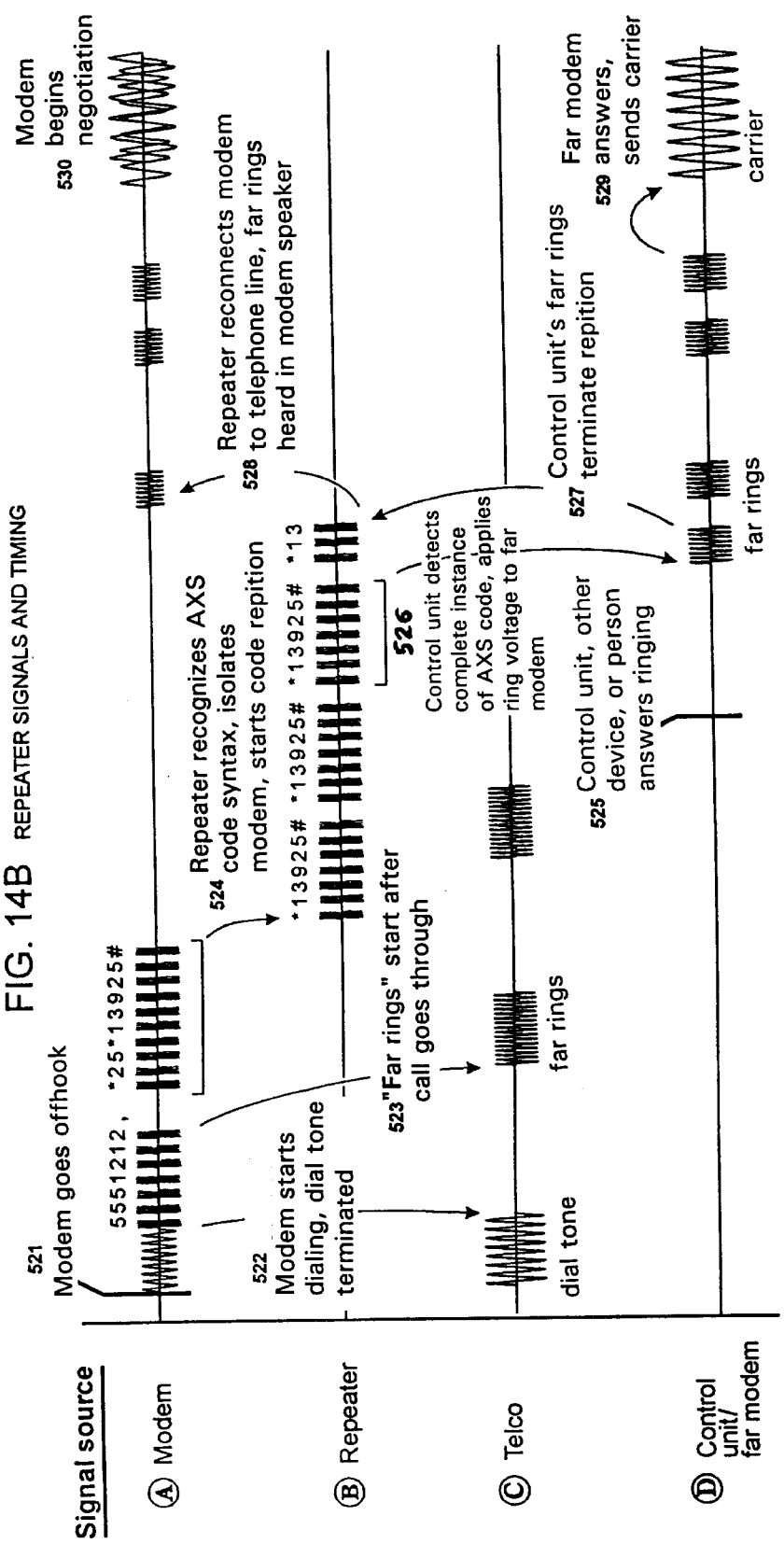
FIG. 14A REPEATER INTERCONNECTION
FIG. 14B REPEATER SIGNALS AND TIMING

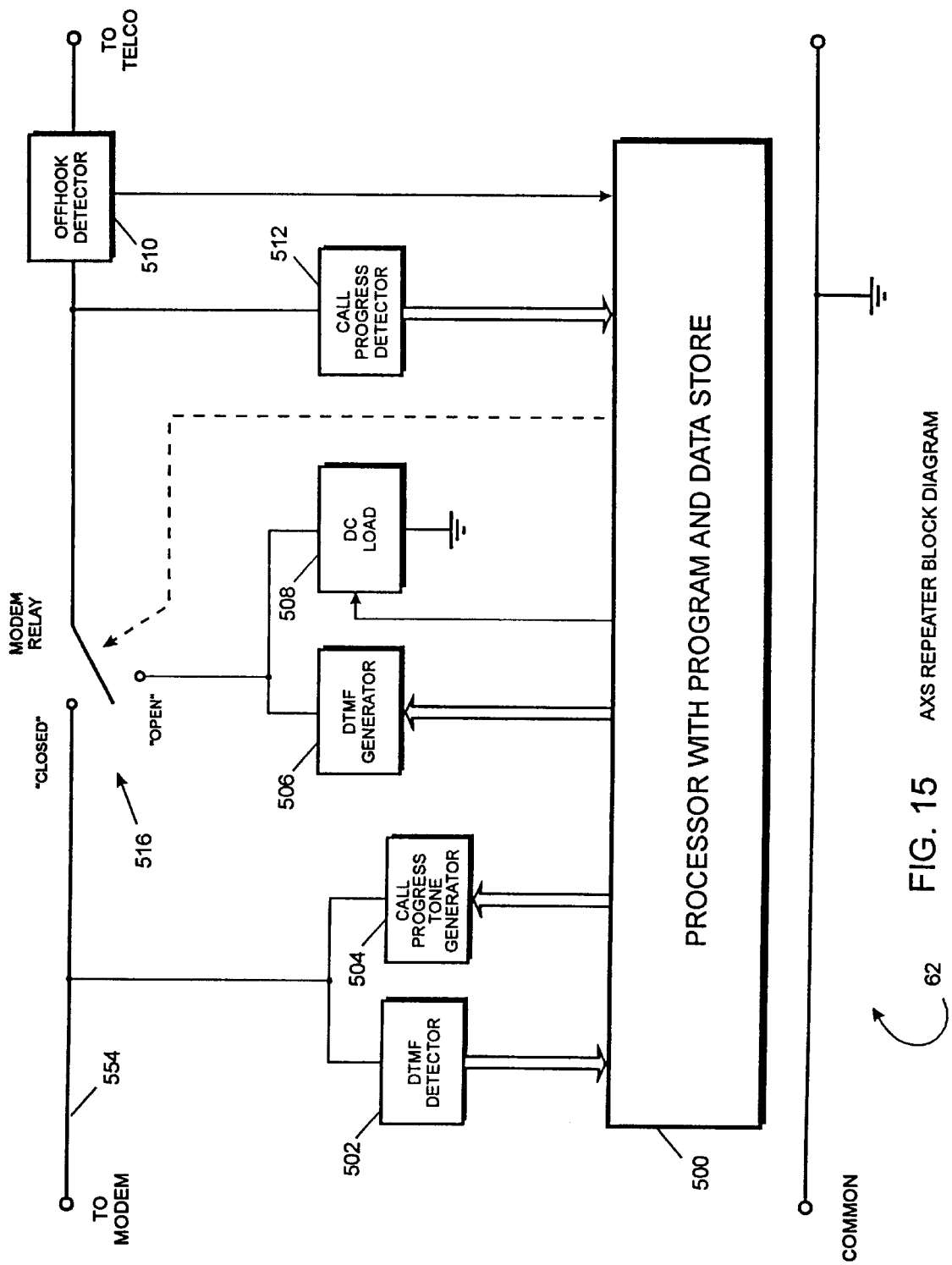
FIG. 15    AXS REPEATER BLOCK DIAGRAM

FIG. 16  AXS REPEATER PROCESSING
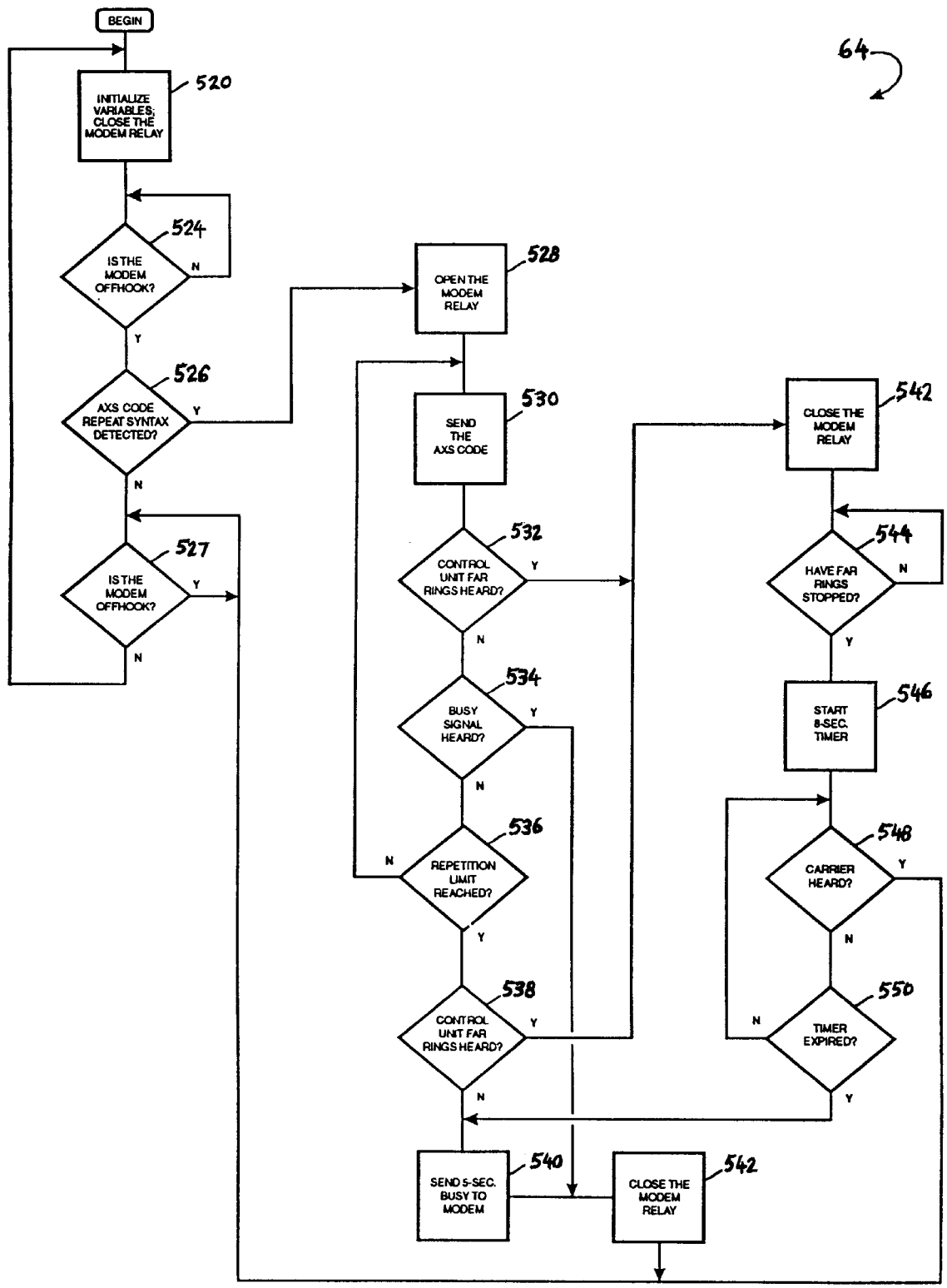

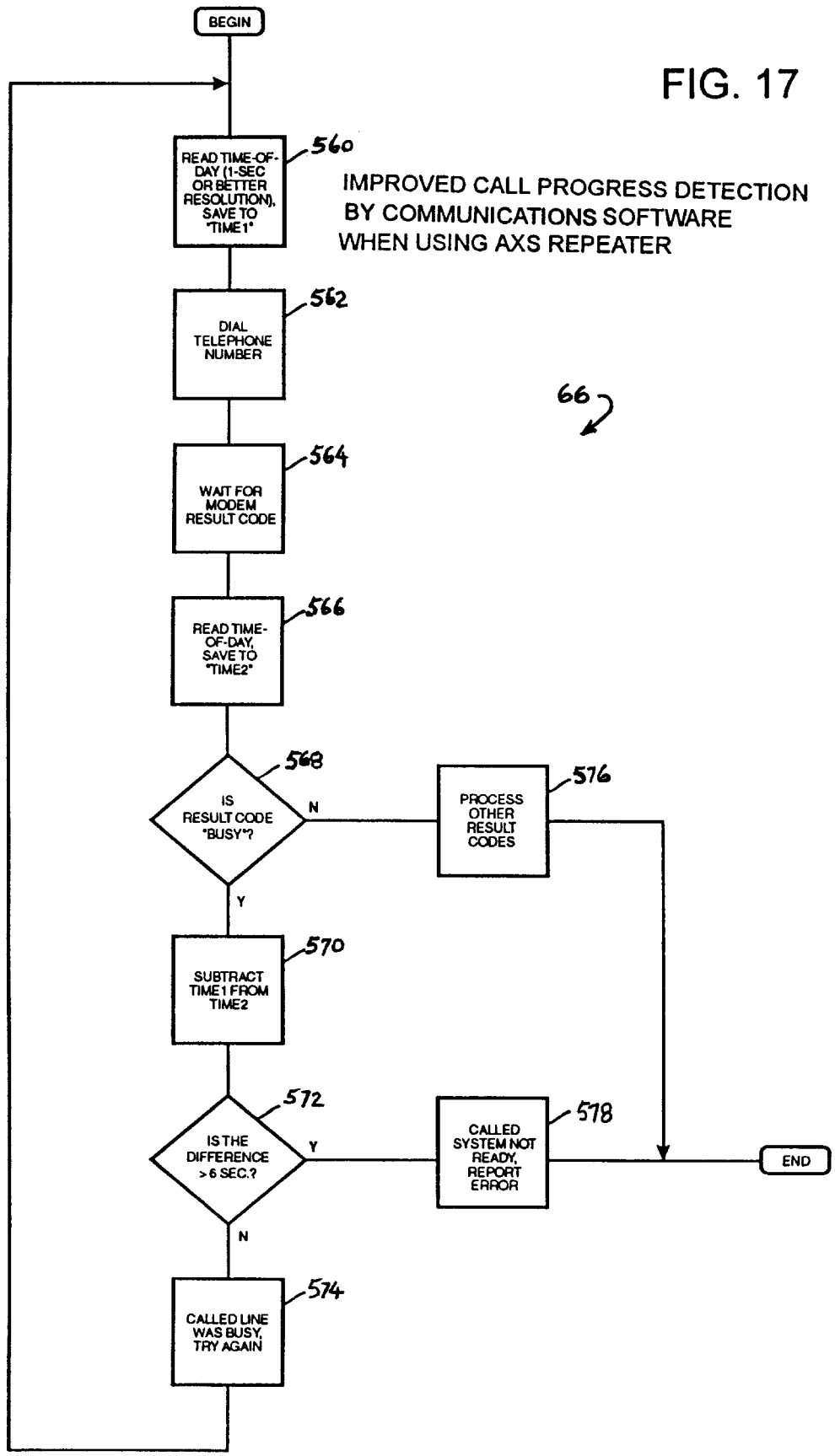

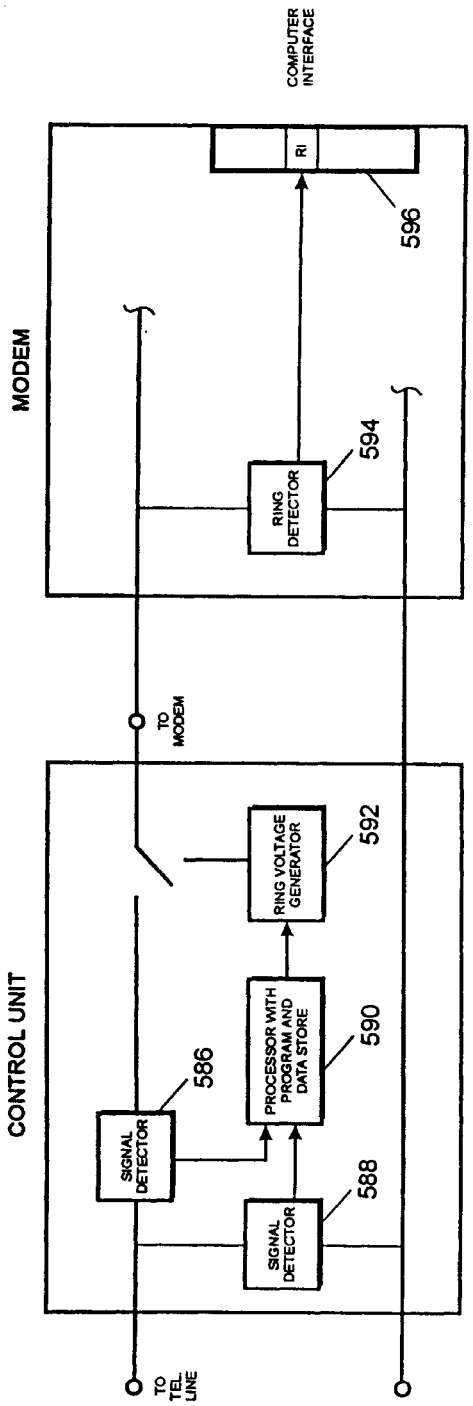
FIG. 18A  SEPARATE CONTROL UNIT AND MODEM
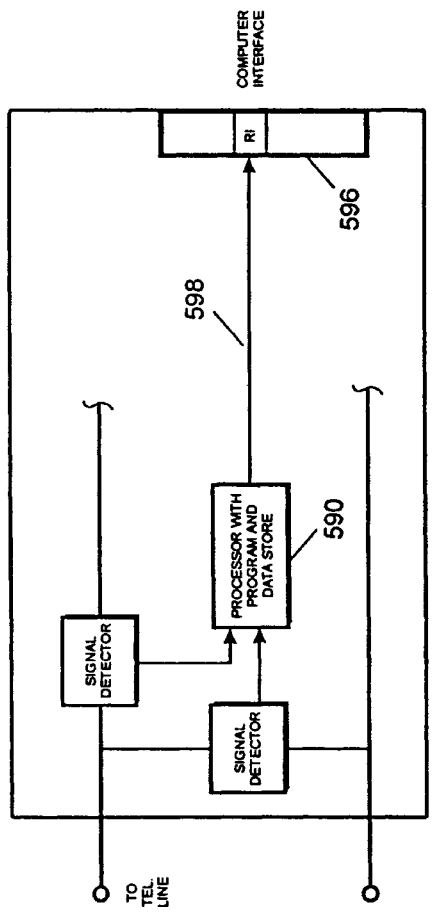
FIG. 18B  INTEGRATED CONTROL UNIT AND MODEM

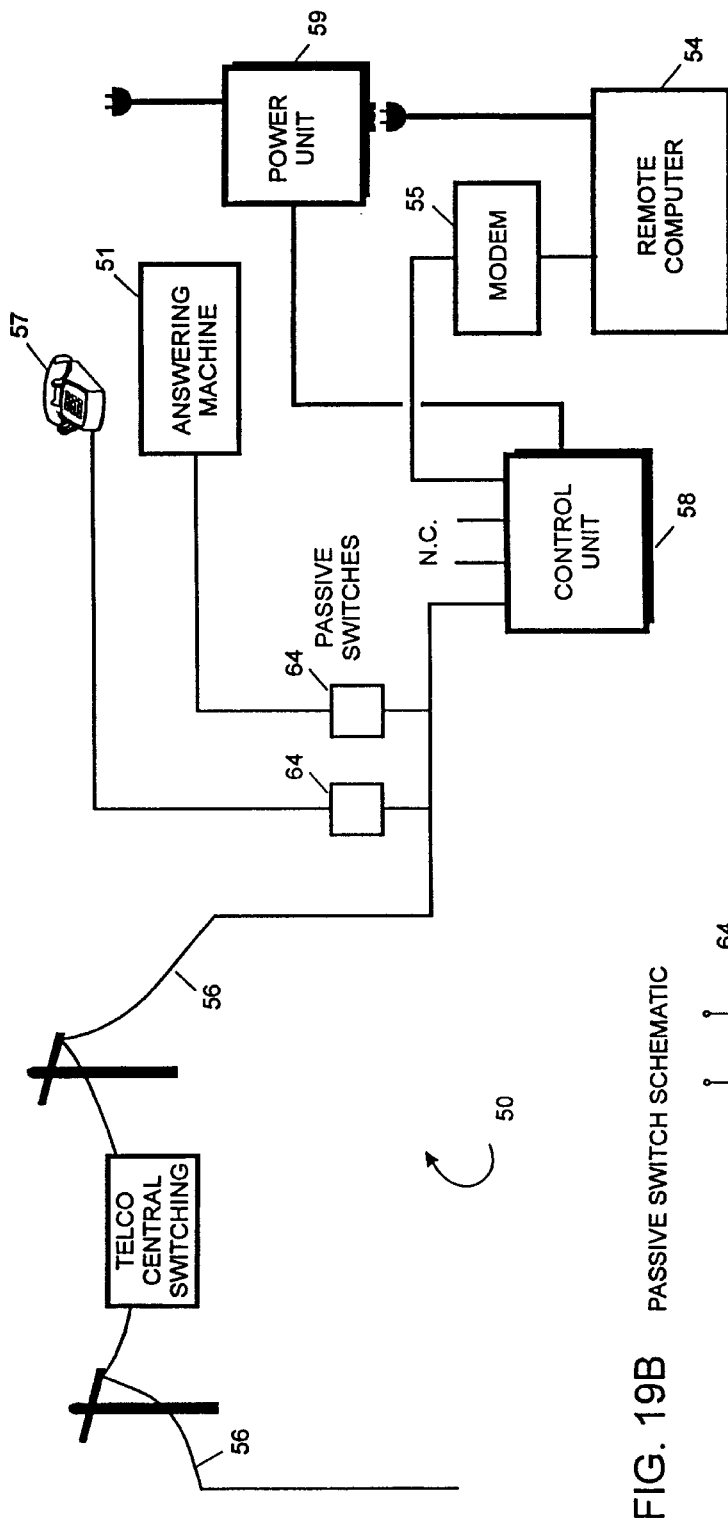
FIG. 19A  PASSIVE SWITCH INTERCONNECTION
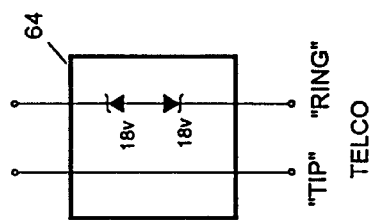
FIG. 19B  PASSIVE SWITCH SCHEMATIC

ELECTRONIC MAIL SYSTEM

RELATED APPLICATIONS

The present application is a continuation-in-part of U.S. patent application Ser. No. 07/773,371, filed Oct. 8, 1991, now abandoned entitled Electronic Mail Remote Data Transfer System.

FIELD OF THE INVENTION

The present invention relates to data transfer systems, in particular, data transfer systems providing file transfer between a local and an attended or unattended remote computer via telephone or other communication medium.

BACKGROUND OF THE INVENTION

Data transfer to or from remote data equipment such as home personal computers has heretofore required the presence of an operator to power-up and initialize the remotely located computer in preparation for receiving or transmitting data. If unattended, such remotely located computers would necessarily be left on and preset to receive file transfer commands or other instructions to provide the desired data transfer. Such continuous operation, however, results in continuous power consumption, increased component wear, and makes the remote unit vulnerable to sophisticated intrusion efforts wherein data may be lost, damaged or unauthorized access gained. In an attempt to reduce power consumption and component wear, some systems include a power switch which is responsive to telephone line ringing signals wherein the personal computer in normally off except after an incoming telephone ring (referred to as a "ring-forward") signal is detected. Thereafter, the computer is turned on and configured to answer the ringing signal. However, such systems provide no pre-screening of non-data or unauthorized calls, resulting in needless sequencing of the computers whenever a telephone call is received. Furthermore, some modems answer immediately after receiving power and will therefore answer the ring-forward signal before essential communications software becomes active following boot up. Alternately, such remote systems requires dedicated telephone lines, not normally provided or economically justifiable in the typical home or small office computer environment. Additionally, if a remote computer system is connected to a non-dedicated telephone line, no prioritized allocation of the line among a plurality of telephone line-associated equipment, such as a telephone desk set, an automatic answering machine, and a local personal computer is provided.

SUMMARY OF THE INVENTION

The system and apparatus according to the present invention automatically establishes a data transfer path between local data equipment and remotely located data equipment over a non-dedicated telephone line which may be shared by other telephone apparatus such as a desk set, an automatic answering machine and a FAX machine. According to the present invention, the remotely located data equipments supervised by a control unit which provides the above-mentioned access security, energizing the computer only upon successful entry through the security check, thereby minimizing the power cycling of the remotely located data equipment (e.g. a computer) due to other uses of the telephone lines and unauthorized attempts at system entry. Moreover, the control unit included in the system according to the present invention will provide for the shared connection of an automatic call answering device, such as a voice answering machine to the telephone line, wherein upon detection of a selected dual-tone multi-frequency (DTMF) or "Touch-Tone™", password signals on the telephone line, the control unit will disconnect the automatic answering device, apply power to the data equipment if necessary, generate a ring signal voltage capable of causing the data equipment to respond as though connected directly to the telephone line, provide subsequent alphanumeric security code processing and, if successful, the ultimate data file transfer. In one embodiment of an improvement of the present invention, the control unit controls other equipment (e.g. FAX machines answering machine) sharing the same telephone line without requiring that such equipment be connected to the telephone line through the control unit. In this improvement, incoming control signals (DTMF) are detected by the control unit after any other device connected to the telephone line goes off-hook, but before the control unit goes 'off-hook', and in concert with a passive switching device interposed between the other equipment and the telephone line, cause such other equipment to operate normally or release the telephone line (go 'on-hook').

When employing local (i.e., non-telephone company) ring-voltage generators, a problem may arise when, after dialing, a calling modem begins listening and finds that the called modem has already answered and is providing a carrier. This situation may result in failure to negotiate a connection, particularly in the case of a common data communications protocol. A further improvement according to the present invention provides the option of operation wherein such situations are avoided by customizing the signalling of the present invention, such as by delaying local ring signals provided by the control unit of the present invention until the appropriate time. Accordingly, the called modem of the present invention doesn't answer the calling modem until the calling modem is ready for it, thus preserving the usual temporal order of the connection sequence.

According to the present invention, the local data terminal and remote data terminal, both typically comprising personal computers, are programmed to automatically establish the file data transfer capacity, as may be applied to electronic mail applications, and include a level of alphanumeric password security inhibiting unauthorized access to the remotely located data files. A further feature of the present invention allows the status of the remotely located data system or the control unit itself to be determined at any available telephone having touch-tone signalling wherein a predetermined touch-tone code sequence results wherein a predetermined touch-tone code sequence results in an audible response from the control unit indicating an audible response from the control unit indicating the requested status such as data system power-on or power-off. An embodiment of a further improvement of the present invention provides the inclusion of a signal repeater outboard from the remote system modem which is activated, programmed and/or controlled by a selected code provided by the remote system modem. The selected code is typically included in the dial-out number buffer and is therefore compatible with existing modem communications software. The repeater may simply repeat the selected code for a selected interval or number of repetitions or may provide a security function by performing translation of the selected code via a table or algorithm. The repeater can be programmed off-line.

If the remote computer system is currently engaged in an activity, as may be provided in any one of several operating systems, such as word processing, the system according to the present invention will minimally interrupt the ongoing operation of the remote computer to provide the data transfer, in the worst case, suspending the current operation to accomplish the data transfer and returning immediately thereafter to the point of operation prior to data transfer. Therefore according to the present invention, a system is provided wherein electronic mail service can be provided to a minimally configured remote location having non-dedicated telephone lines which decouples the incoming ring, boot up, and the local ring events so as to accommodate the timing needs of any PC installation. An embodiment of a further improvement of the present invention provides the integration of the control unit with a modem which communicates with the computer via parallel or serial data ports. Typically, such embodiments will obviate the need to generate a secondary ring voltage signal for the modem portion of the circuit while transferring the signalling and control information directly to the computer via the parallel or serial port.

BRIEF DESCRIPTION OF THE DRAWINGS

These and other features of the present invention will be better understood by reading the following Detailed Description taken together with the Drawing, wherein:

FIGS. 2A and 2B are schematic diagrams of the control unit of FIG. 1;

FIG. 10A is the modem off-hook subroutine of the control unit of FIG. 1;

FIG. 10B is the process modem batch commands subroutine of the control unit of FIG. 1;

FIG. 11 is the ready-button-down subroutine of the control unit of FIG. 1;

FIG. 13 is a protocol timing diagram of one embodiment of the present invention as described in FIGS. 3–12;

FIG. 14A is a block diagram of one embodiment of the improvement comprising the code repeater according to the present invention;

FIG. 14B is a signalling sequence drawing for the system including the code repeater of FIG. 14A according to one embodiment of the present invention;

FIG. 15 is a block diagram of the code repeater according to one embodiment of the present invention;

FIG. 16 is a flow chart of the code repeater operation according to one embodiment of the present invention;

FIG. 17 is a flow chart of improved call process detection according to one embodiment of the present invention;

FIG. 18A is a block diagram of an embodiment having separate implementation of the control unit and modem; and FIG. 18B is a block diagram of the integrated control unit/modem according to one embodiment of the present invention.

FIG. 19A is a block diagram of the system in FIG. 1 with the addition of passive switching devices in an embodiment of an improvement to the present invention.

FIG. 19B is a schematic diagram of one embodiment of the passive switching device in FIG. 19A.

DETAILED DESCRIPTION OF THE INVENTION

Figure 1:
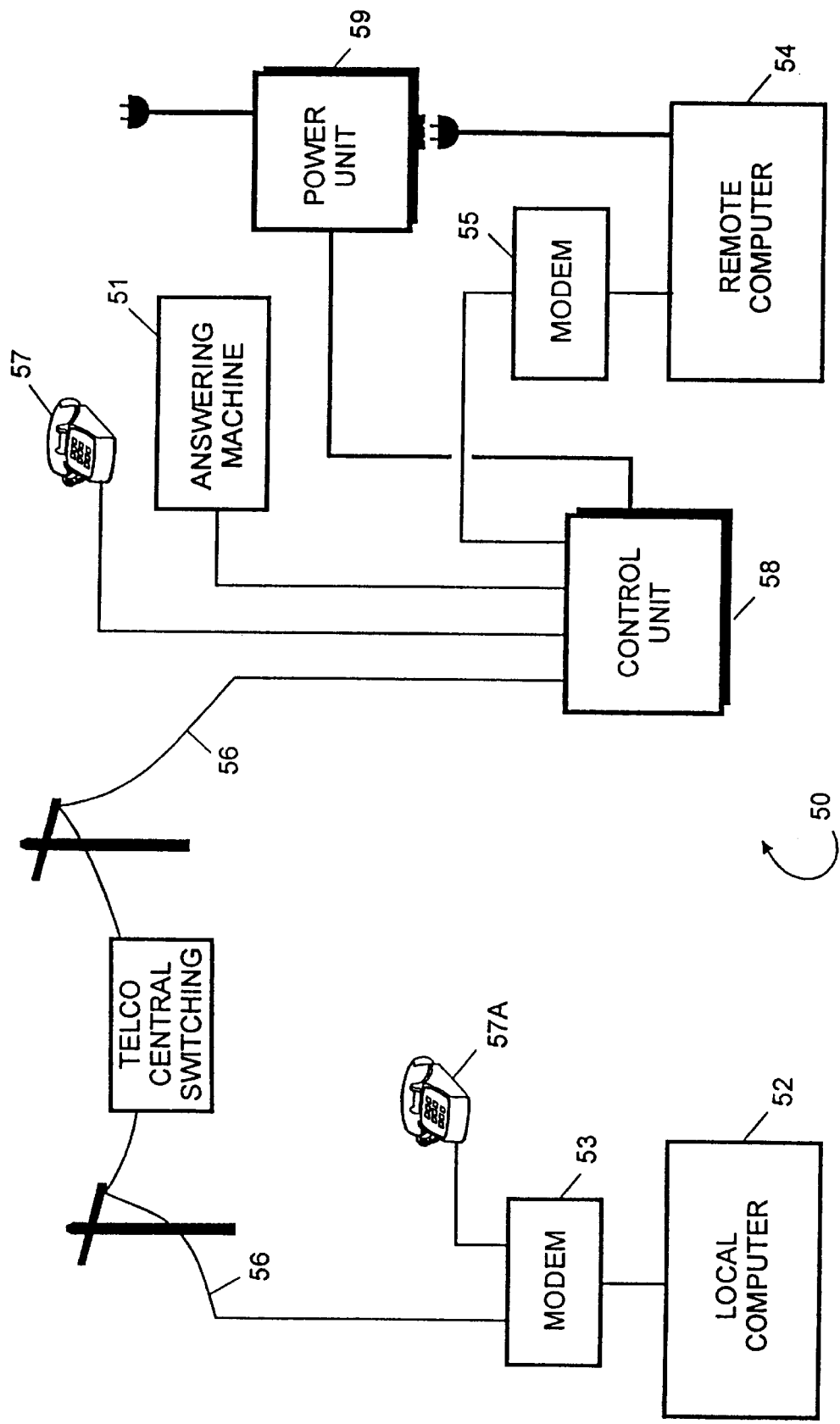
FIG. 1 is a block diagram of a system including the remotely located computer and the control unit according to one embodiment of the present invention.
Figure 3:
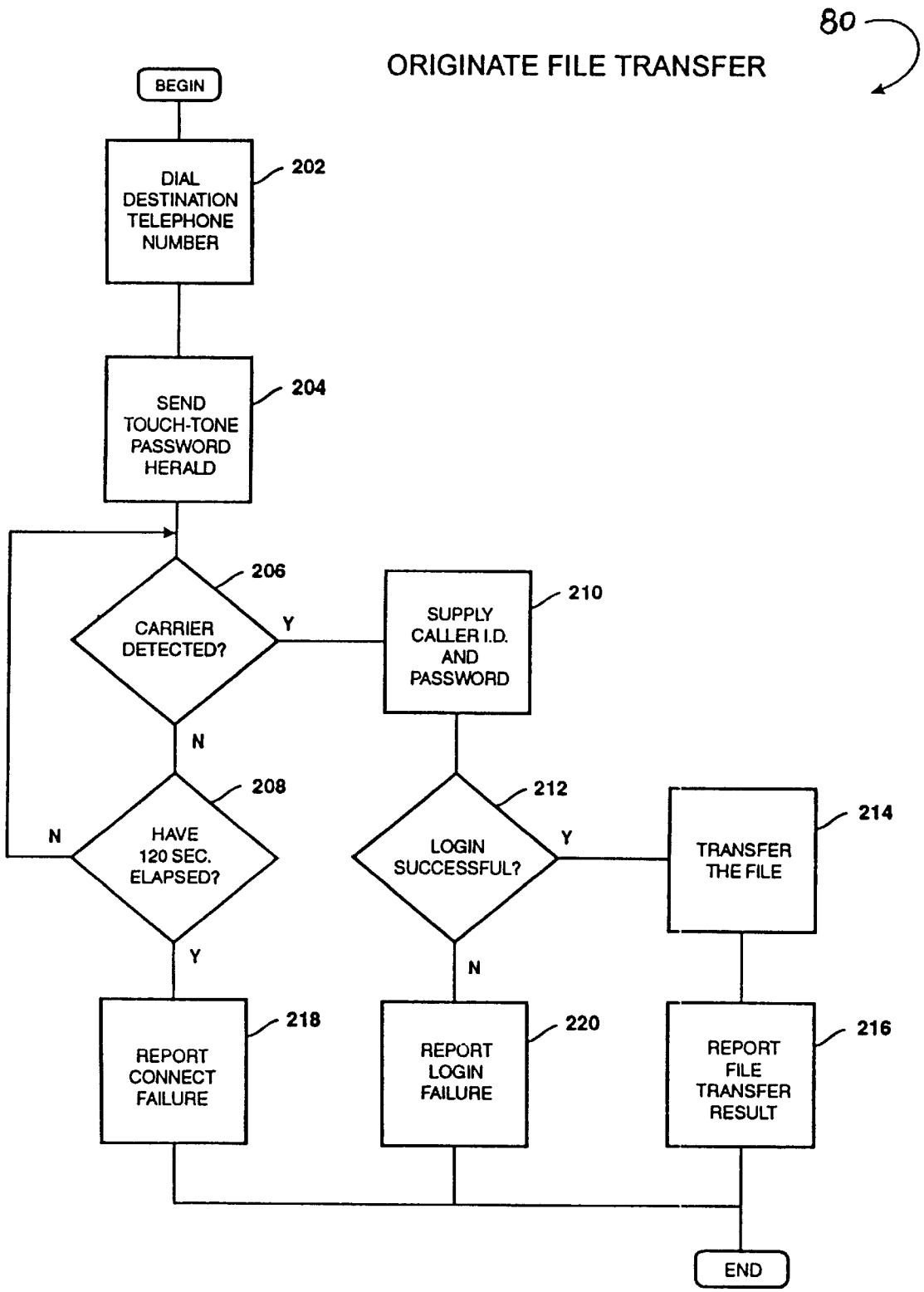
FIG. 3 is a flow chart showing a program sequence resident in the originating computer according to FIG. 1.
Figure 4:
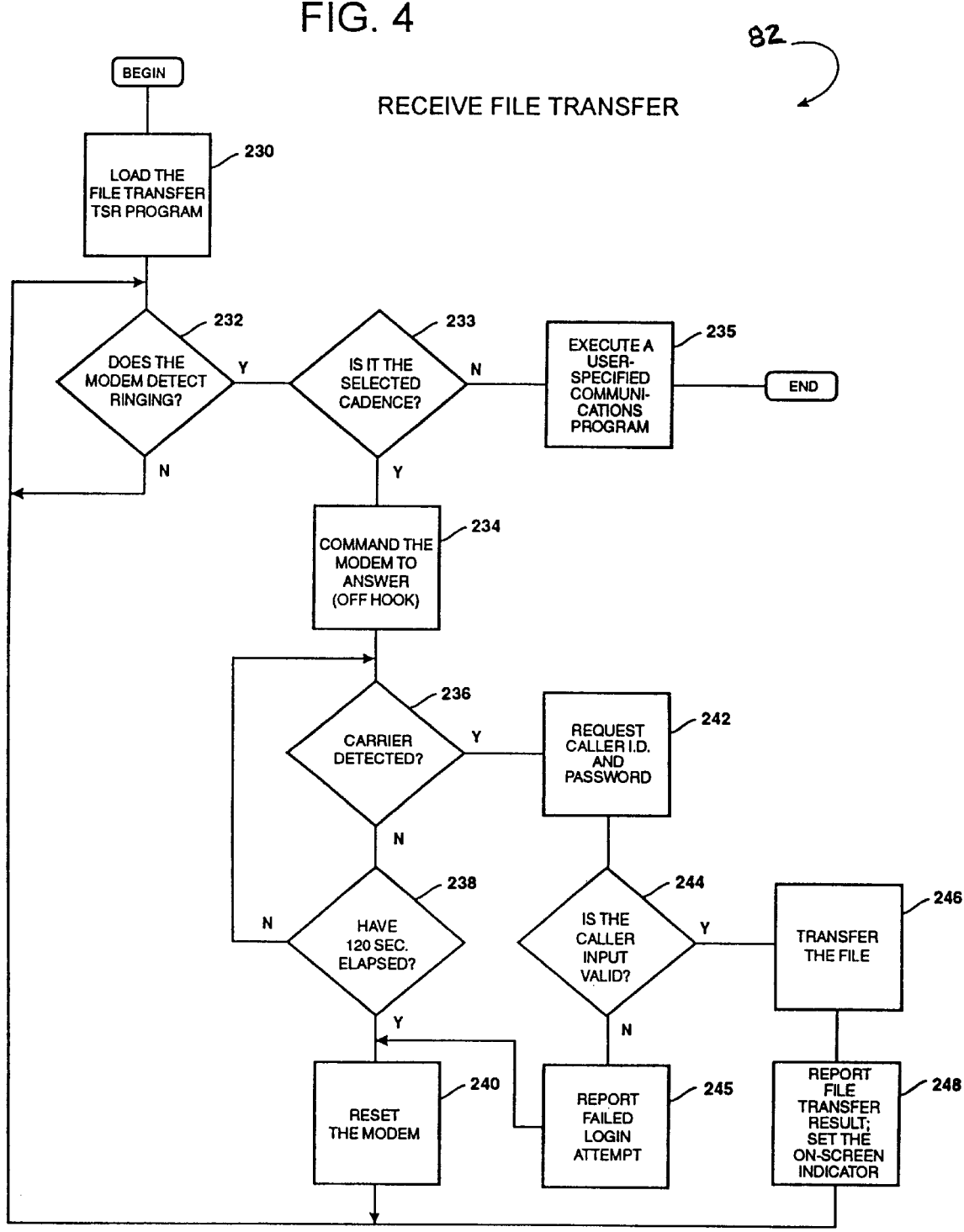
FIG. 4 is a flow chart showing the program resident in the remotely located computer according to FIG. 1.

The present invention is shown in FIG. 1, in a system 50 which provides the file transfer between a local computer 52 and a remote computer 54 through a communication medium such as a telephone line 56 through modems 53 and 55 in, or connected to, computers 52 and 54 respectively. According to the present invention, control of the remote computer 54 is provided by a control unit 58 which is connected to a non-dedicated telephone line 56. The non-dedicated telephone line can also be connected to other devices such as a desk set 57 and an answering machine 51. Power to the remote computer 54 is controlled by the power unit 59 connected to the control unit 58. The local computer 52 and the remote computer 54 include operating system software such as MS-DOS™ and may be further programmed with software such as LOTUS 1-2-3™. The local computer 52 is operable according to a program comprising this invention as illustrated by the flow chart of FIG. 3, to originate the establishment of data or file transfer. The remote computer 54 is operable by program software comprising this invention as illustrated by the flow chart of FIG. 4 to provide a response to a request for data transfer. The remote computer control unit 58 comprises the hardware illustrated in FIGS. 2A and 2B and is operable according to the flow charts of FIGS. 5–12, as well as modifications made by those of ordinary skill in the art.

According to one embodiment of the present invention, both the local computer 52 and the remote computer 54 and their respective modems 53 and 55 are commonly available commercial products such as the IBM PC computers and the Hayes modems or their equivalent. The modems may be internal components of the computers or connected externally. The communication medium 56 typically comprises a normal telephone line 56, but other media may be used, for example isolated wiring employing the standard RJ-11 telephone jacks may be used in the home. The telephone switching office operates conventionally and forms no part of the invention. Similarly, the telephones 57 and 57A illustrated in FIG. 1 and the answering machine 51 comprise standard commercially-available units. Therefore, the present invention permits the above-mentioned and below-described improvements with minimal interference with standard system configurations, except for the redirected telephone line connections through the control unit 58 and the power connection through the power unit 59.

According to a further improvement of the present invention, the telephone 57, answering machine 51, and other equipment (e.g. FAX) may share the same line 56 without connecting through the control unit, but through individual devices 64 which allow the telephone 57, answering machine 51 and other equipment to release the telephone line when the control unit applies a load to the telephone line 56. The devices 64 typically comprise a fixed voltage drop element, e.g. back-to-back zener diodes inserted in series with each equipment.

Figure 2B:
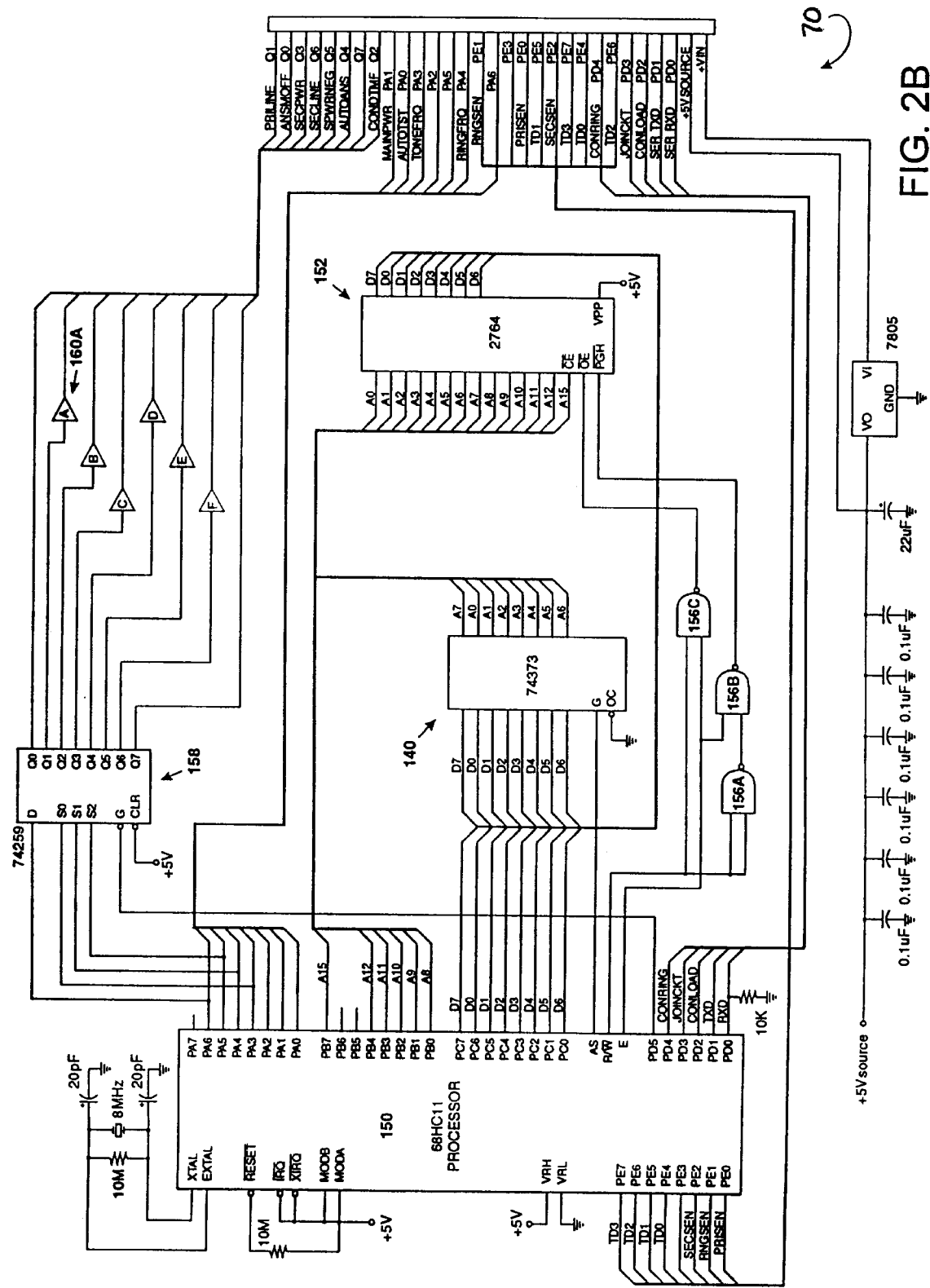

The control unit 58 of FIG. 1 is described in greater detail by the schematic diagrams illustrated in FIGS. 2A and 2B and the flow chart illustrations of the firmware stored in the memory 152 and executed by the microprocessor 150, according to the flow chart representations of FIGS. 5–12. In the schematic diagram 60 of FIG. 2A, a telephone line 56 of FIG. 1 is connected to line-in jack 102 which provides connection to telephone 57 through local phone jack 104 and connection to relays 106 and 108. In a quiescent or power-off condition, the relays 106 and 108 provide connection of an auto answering device, such as a telephone answering machine and a facsimile machine, via jack 110 to the line input 102 for normal automatic answering. Relays 106 and 108, controlled by their respective transistors and microprocessor 150 of FIG. 2B route the telephone signal as described previously, and in greater detail below. For instance, when touch-tone or data signals are detected, such as by the DTMF receiver 112 of various manufacturers, which is connected to receive signals from the line input from jack 102, by the microprocessor 150 connected to receive the four digital signals from the DTMF receiver 112, they cause the relay 108 to become energized, disconnecting the answering device connected at jack 110 and connecting the modem of the remote computer 54 or other telephone device connected via jack 114. Simultaneously, the microprocessor 150 of FIG. 2B enables the power unit 59 of FIG. 1 to power the remote computer 54 via pins 28–31 of the microprocessor 150. Having turned on the remote computer 54, the associated modem 55 is now operable to receive signals, whereupon the microprocessor 150 generates a 20 Hz high-voltage ring signal via circuit 120 which is applied to the modem by relay 106 as controlled by the microprocessor 150 through the transistor associated with relay 106.

A ring-forward sense signal on 598 is provided by circuit 130 to the computer as shown in FIG. 18B, whereupon a signal is received by the microprocessor 150 upon detection of a ring signal on the line input of jack 102. A primary off-hook sense signal is provided by circuit 140 and a secondary off-hook signal is provided by circuit 150 to indicate to the microprocessor 140 the presence of the off-hook condition of the incoming line input and the relative off-hook condition of the modem 55 connected to jack 114.

Figure 2C:
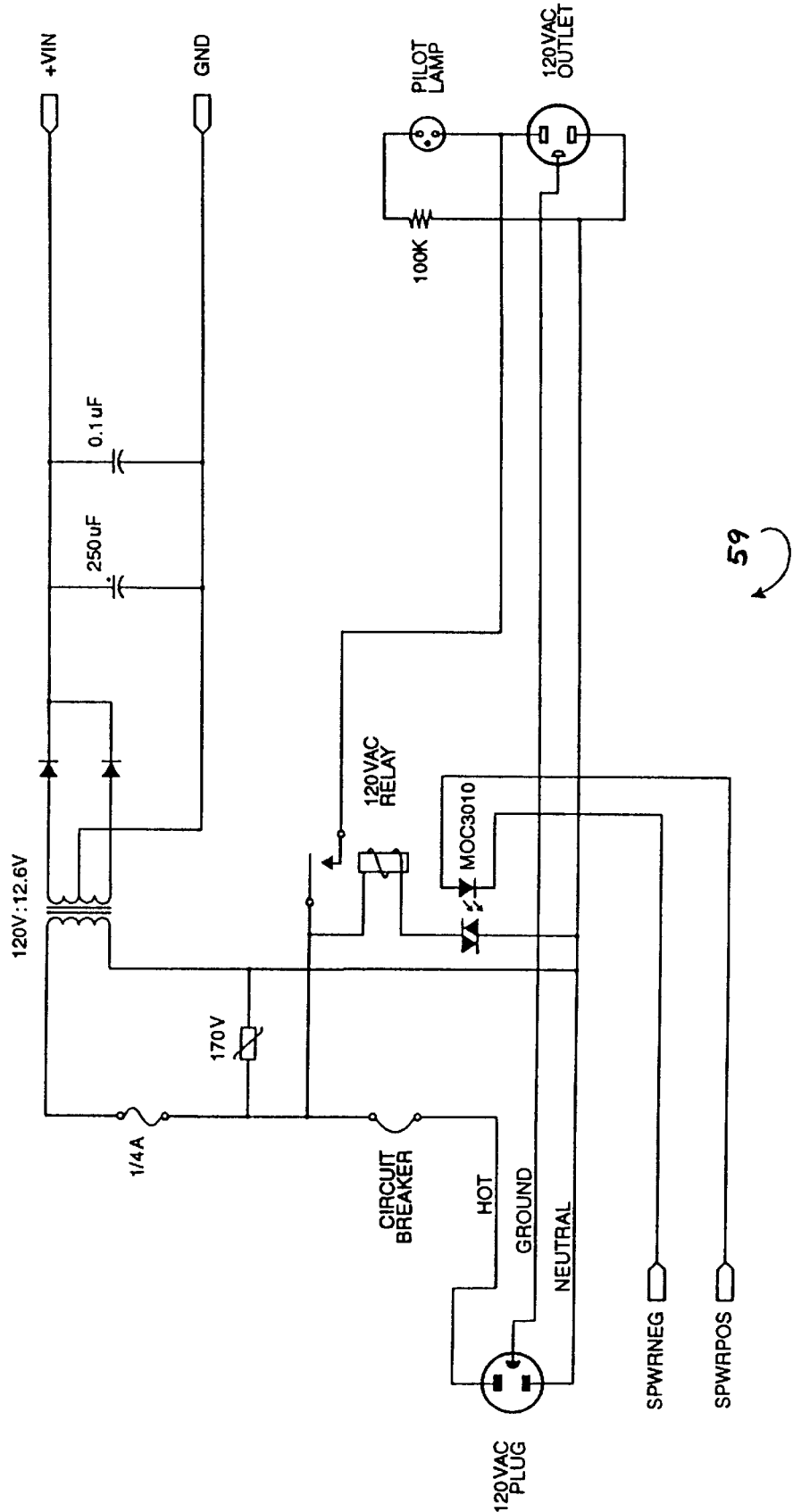
FIG. 2C is a schematic diagram of the power unit of FIG. 1.

The power control provided by power unit 59 in response to the control signal from the control unit 58 is provided by an optically-coupled triac and relay combination shown in FIG. 2C or other power element which provides AC switching functions in response to a low level signal as may be provided by the microprocessor 150 of FIG. 2B.

The microprocessor control section of the control unit 58 is shown in more detail in the schematic diagram 70 of FIG. 2B wherein the microprocessor 150 is operable according to firmware control stored in memory 152, and is operable according to the flow charts of FIGS. 5–12. The memory 152 receives address signals via register 154, and is controlled by signals from the microprocessor 150 through gates 156A, 156B and 156C. While the microprocessor 150 comprises a 68HC11 manufactured by Motorola Corporation and others. Additional control signals are provided by the microprocessor 150 via 8-bit addressable latch 158 and gates 160A, B, C, D, E, and F. Signals directed from the microprocessor section to the line interface section 60 of FIG. 2A are provided through correspondingly labelled tags on the periphery of 2A and 2C and include signals to light-emitting diode (LED) indicators 118 of FIG. 2A providing the indication of selected states of the control unit, computer modem and other line conditions as described According to the present inventions the local computer 52 of FIG. 1 includes a program which operates in the context of an operating system, such as the one belonging to the Apple Macintosh, or DOS in the case of IBM PC-type computers. The program, although not necessary for some aspects of the present invention, provides for the automatic origination of data file transfers as illustrated in the flow chart 80 of FIG. 3. The destination telephone number is dialed at step 202 and a DTMF password is repetitively sent at step 204. After transmission of the DTMF password at step 204, the local computer waits for a signal tone relayed by the control unit 58 at step 206, until a specified time, such as 120 seconds, has elapsed, as provided by step 208. If a carrier is detected, as provided by the remote computer control unit 58, the local computer then supplies the caller identification (ID) and password at step 210 when prompted by the remote computer 54 at step 242 of FIG. 4. A typical correct response results in a successful log-in process at step 212, which is then followed by the transfer 214 of the data between the remote computer 54 and the local computer 52. The results of the file transfer are reported at 216, typically by an on-screen or other visual or audible indication as may be provided. Specifically, the receipt of a file results in a flashing indicator light and the appearance of an on-screen indicator. Similarly, if more than the specified time has elapsed, a failure to connect is reported at step 218 and a log-in failure, such as the refusal of the log-in caller ID and/or password is reported at step 220.

The remote computer 54 includes a program which responds to the telephone-ringing flags set by the modem 55 when the remote computer 54 is powered-on by the power unit 59 in response to the control unit 58, which was in turn previously activated by the signal sequence discussed above as iterated by the local computer 52. The program sequence is described generally in flow chart 82 of FIG. 4, wherein the remote computer 54 optionally loads and executes the service program of 82 at step 230, and begins polling the modem to determine if a telephone ringing signal is being received at step 232. If a ringing signal is detected by the modem, the cadence of the signal, meaning the characteristic durations of AC ring voltage present and absent in a cycle, is examined at 233. If the cadence is recognized as that generated by the control unit 58 to indicate that an automatic data transfer is desired, the modem is commanded to answer (go off-hook) at step 234 and wait for a carrier detect within a specified time period, e.g. 120 seconds, steps 236 and 238. If instead a determination is made at step 233 that the cadence indicates a different communications program is desired, this program, identified earlier during installation of software on the remote computer 54, is executed at 235. Step 233 thus permits more complete access to the files on the remote computer 54, afforded by the more elaborate program 235, at the cost of consuming more of the computer's resources and effectively preempting simultaneous operations under the DOS operating system. If no carrier is detected at step 238 the modem is reset at step 240 and the remote computer 54 again awaits the ringing signal at step 232. If a carrier is detected at 236, a signal is sent to the local computer 52 which requests or prompts the local computer 52 to provide a caller ID and a password at step 242. The caller ID and password are verified at step 244, and if found appropriate a file transfer is executed at step 246. If at least one of the received caller ID and password fails to belong to the set of valid caller ID and password combinations stored at the remote computer 54, the modem is reset at step 240. The transfer of a file or other data at step 246 is completed after which the transfer is reported by appending an entry to an event log file and issuing an on-screen or audible operator signal at step 248.

Figure 5:
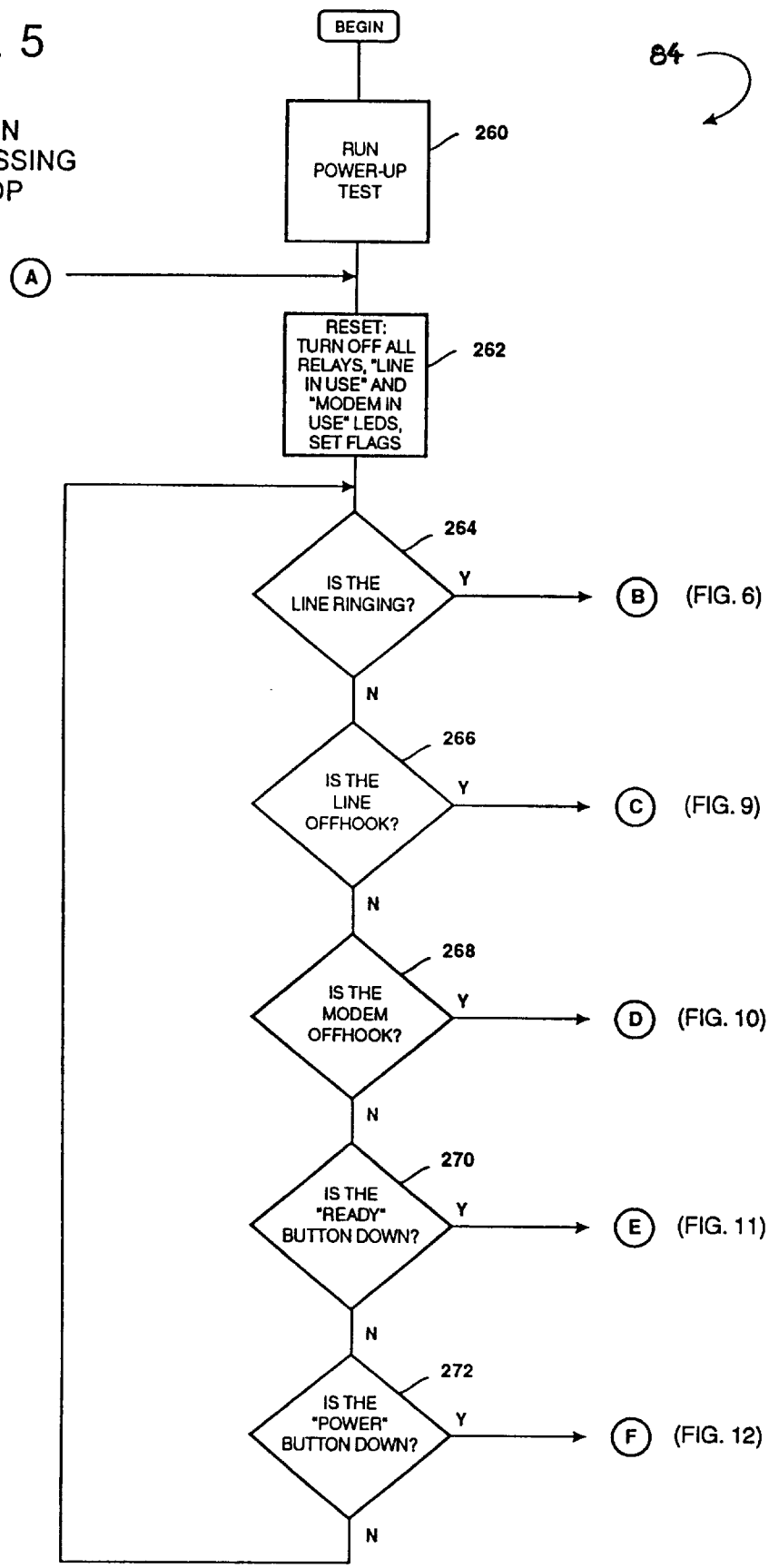
FIG. 5 is the flow chart of the main processing loop of the control unit of FIG. 1.
Figure 6:
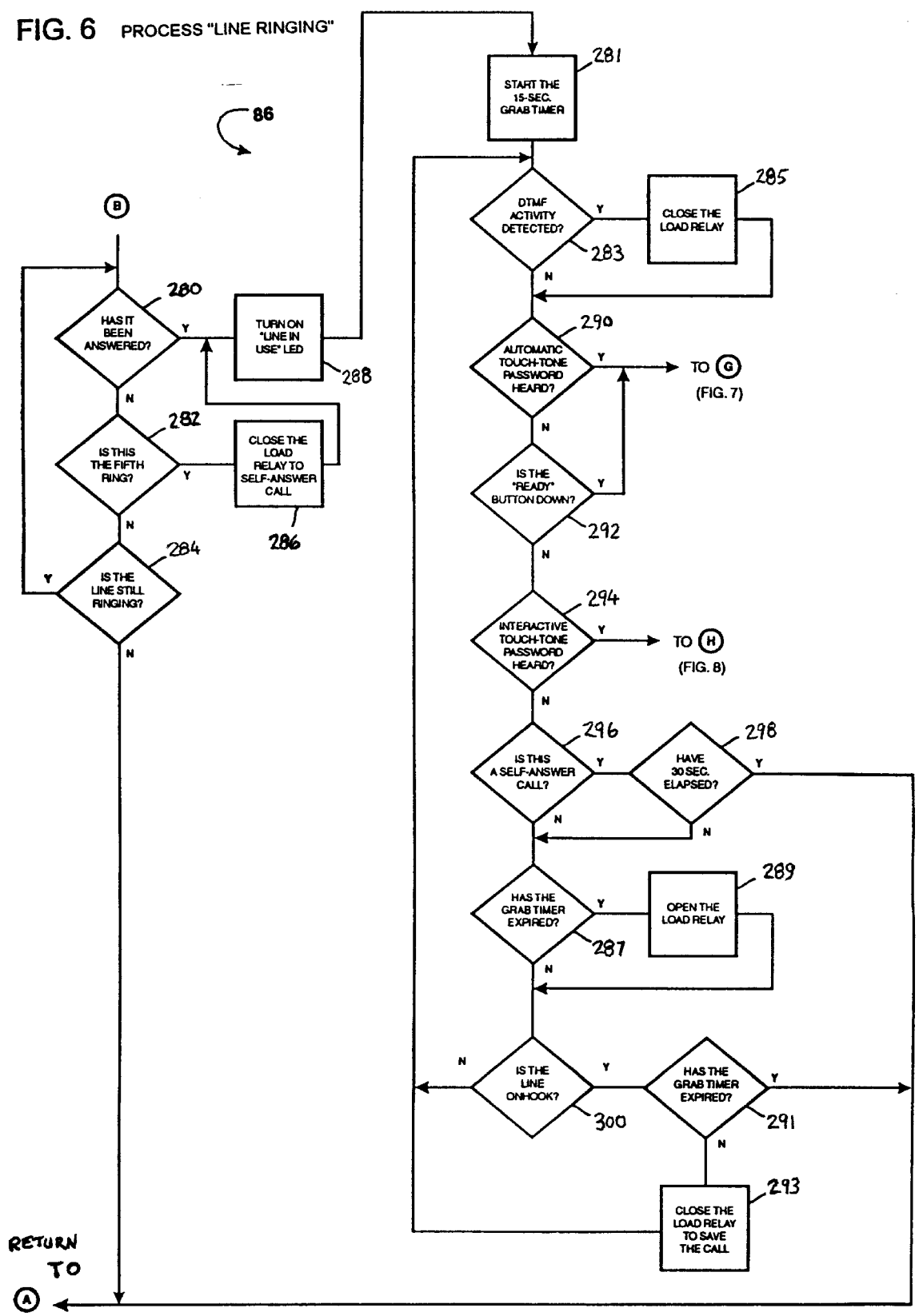
FIG. 6 is the line-ringing service subroutine of the control unit of FIG. 1.
Figure 9:
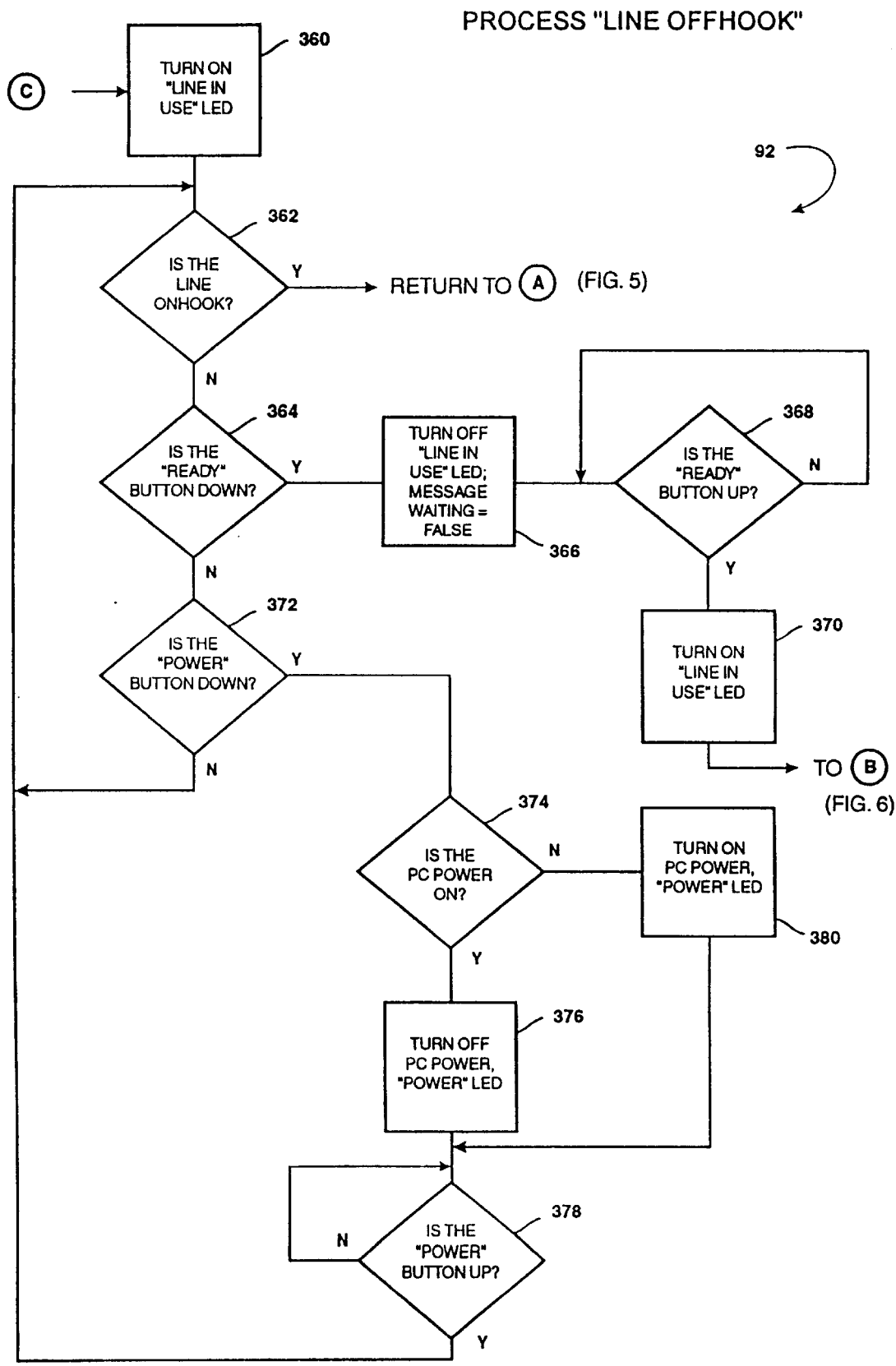
FIG. 9 is the line off-hook subroutine of the control unit of FIG. 1.
Figure 12:
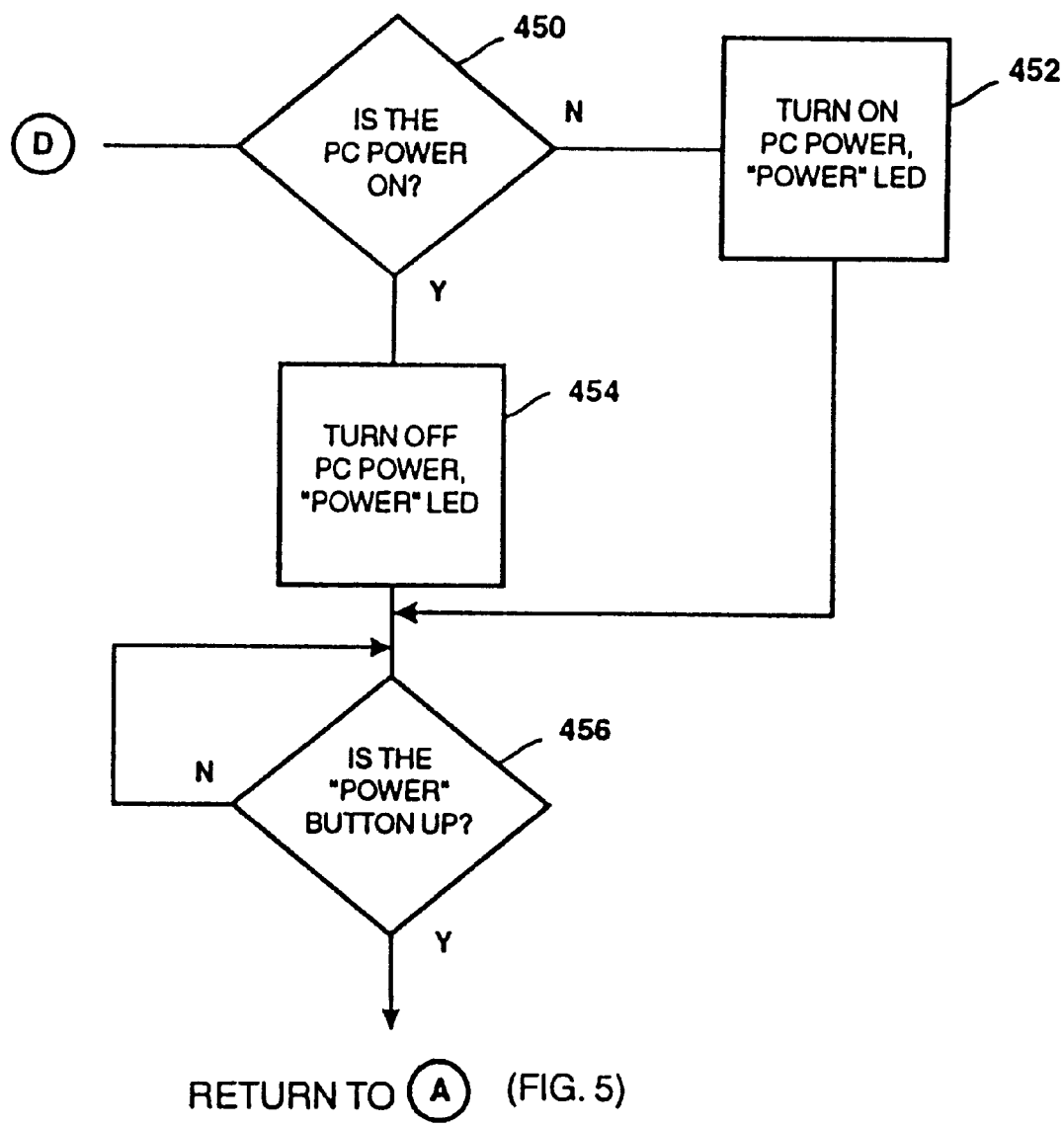
FIG. 12 is the power-button-down subroutine of the control unit of FIG. 1.

The control unit 58 associated with the remote computer 54 includes a microprocessor-controlled system having firmware to provide the appropriate detection, signalling, and control functions. The main processing loop flow chart 84 is shown in FIG. 5. Upon initial power-up, such as when first plugged into the power main of the remote site, the control unit provides an automatic power-up self-test at step 260. All internal and external signals are reset at step 262 and the main program enters a loop. The main loop includes a test 264 to determine if a telephone line ringing condition exists. If a ringing signal is present on the telephone line 56 connected at jack 102, the line ringing subroutine 86 of FIG. 6 is begun. An off-hook condition of the line is determined at step 266, and the line off-hook subroutine 92 of FIG. 9 is entered. If the modem 55 of the remote computer 54 is off-hook, as determined by step 268 via sub-circuit 148 of FIG. 2A, the modem off-hook subroutine 94 at FIG. 10 is begun. If the "ready" button 121 (FIG. 2A) is depressed (contact closed), as determined by step 270, the ready-button-down subroutine 96 of FIG. 11 is begun. If the "PC power" button 119 (FIG. 2A) used to manually turn on the remote computer is depressed, the power-button-down subroutine 98 of FIG. 12 is begun. Until one of the above conditions is detected, the main processing loop 84 repeats. Upon completion of any of the aforementioned five tests and related subroutines, the programs re-enter the main processing loop prior to step 262, wherein the control unit signals are reset.

Figure 7:
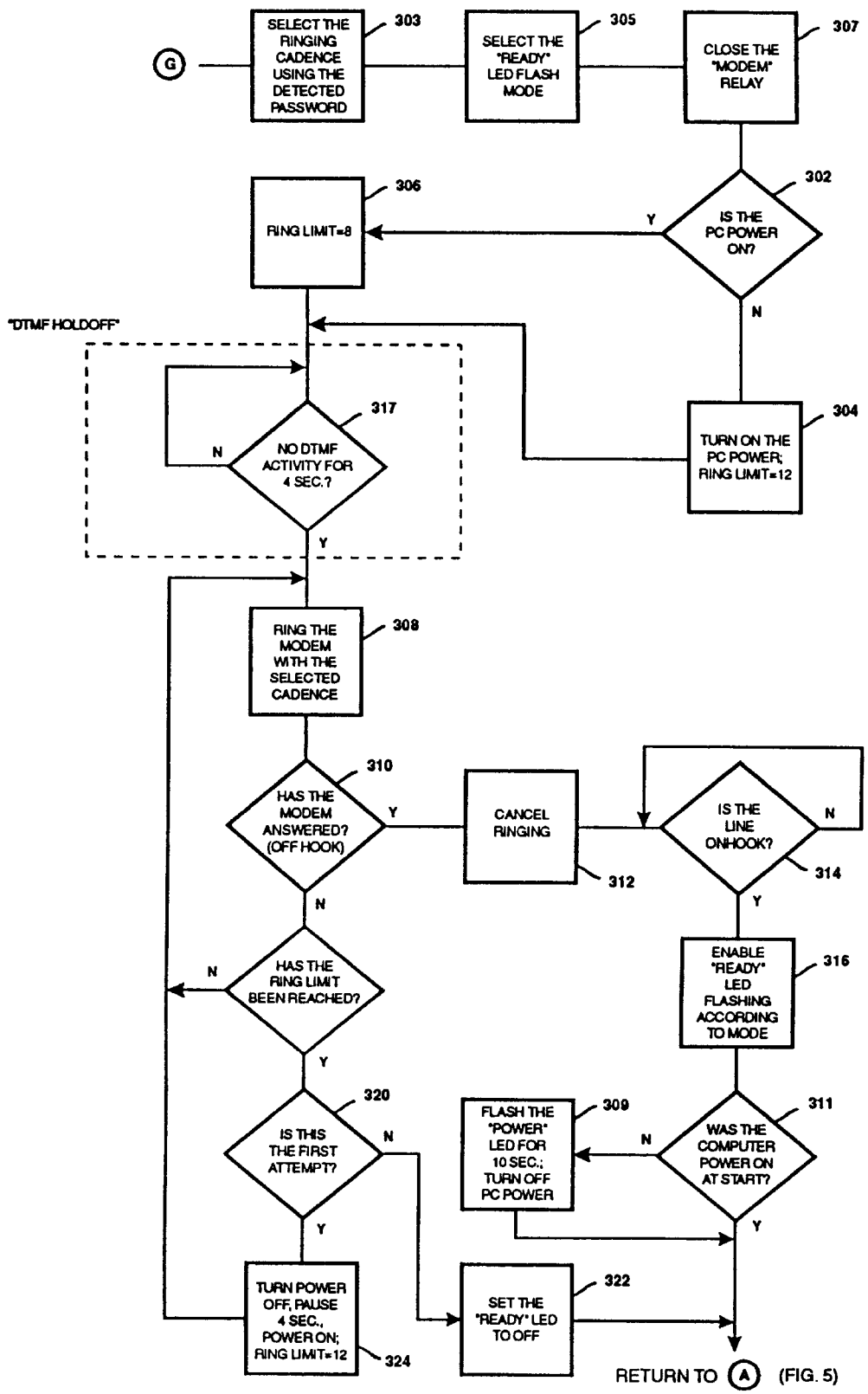
FIG. 7 is the automatic-mode DTMF password subroutine of the control unit of FIG. 1.
Figure 8:
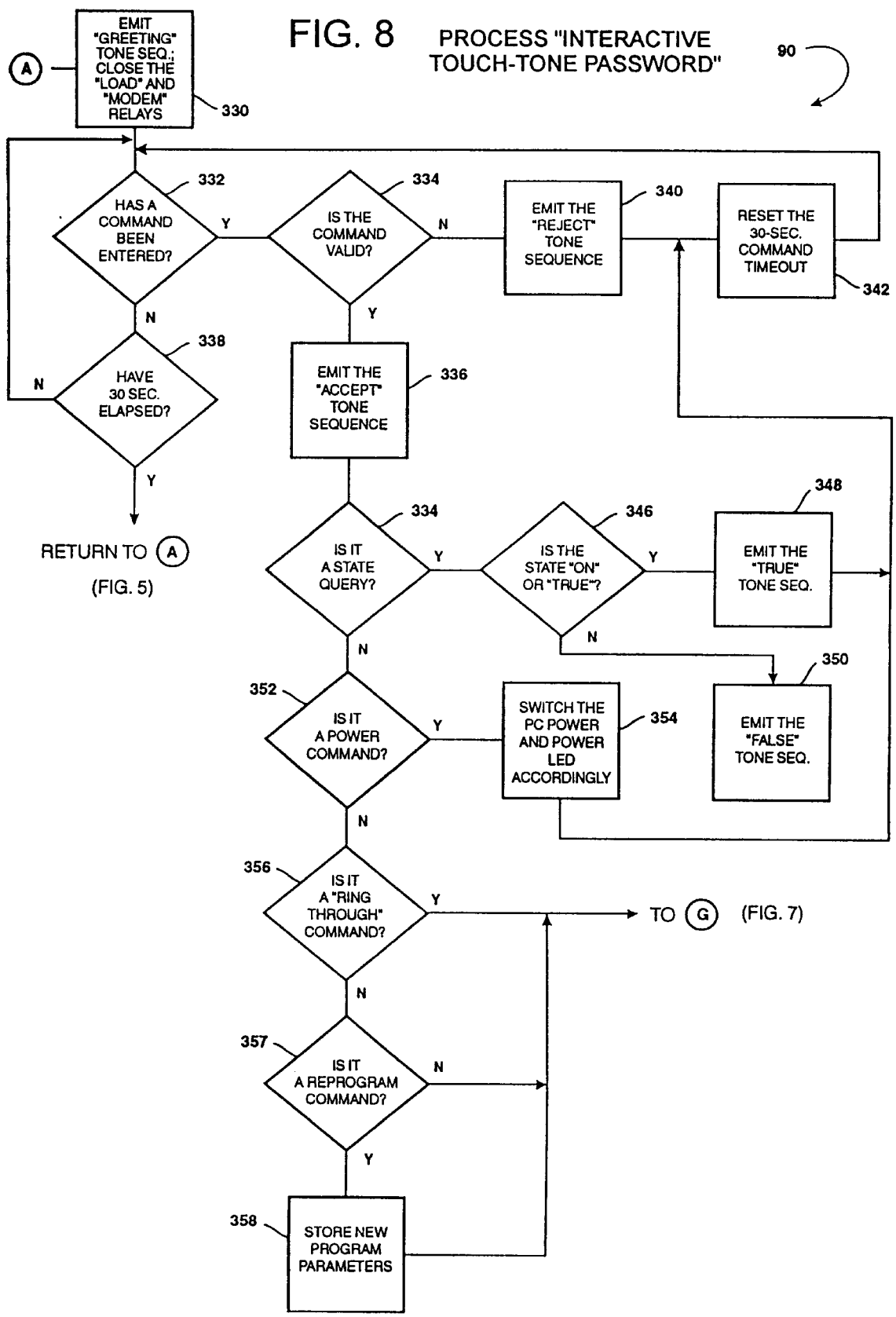
FIG. 8 is the interactive-mode DTMF password subroutine of the control unit of FIG. 1.

The Line Ringing process according to one embodiment 86 of the improvement of the present invention is shown in FIG. 6, which determines if the telephone line has been answered, at 280. If it has, the 'line in use' indicator is turned on at 288, and the 'grab timer' is started at 281. If the fifth ring has occurred at 282, the load relay is closed at 286 and the unit goes off-hook at 286 and the process continues from 288. If the fifth ring has not occurred, the process loops at 284 to see if it has been answered at 280; if at 284 it is not still ringing, the process returns to the main processing loop at 284. The line is monitored for a selected threshold of DTMF activity, at 283, which if detected, causes the telephone line load relay to be closed, at 285. Thereafter or if no DTMF activity is detected at 283, the line is monitored for a DTMF password, at 290 and the 'ready' button is monitored at 292; if either is detected, the Automatic Touch-Tone Process 88 of FIG. 7 is begun. If neither is detected but a DTMF password signifying the interactive mode is detected at 294, then the interactive touch tone process 90 of FIG. 8 is begun. If the interactive mode is not selected at 294, then if the current call was self-answered at step 286, such determination made at 296, and 30 seconds have elapsed at 298, the process 86 returns to the main processing loop of FIG. 5. If the call is not a 'self answer' or 30 seconds have not elapsed, it is next determined at 300 if the line 'on-hook'; if the line is 'on-hook', it is determined if the 'grab timer' has expired at 291; if true, the process 86 returns to the main processing loop of FIG. 5. If the line is 'off-hook' at 300, the process again begins monitoring for DTMF activity at 283, thereafter proceeding as described above. If the line is 'on-hook' at 300 but the 'grab timer' has not expired at 291, the load relay is closed at 293, the line is monitored for DTMF activity at 283, and the subsequent process steps proceed as described above.

The improvement of the present invention according to the embodiment of the Automatic Touch-Tone Password process 88 shown in FIG. 7 selects the ringing cadence using the detected password at 303, selects the 'ready' indicator flash mode at 305, closes the modem relay at 307 and then detects if the PC power is on at 302. If the PC power is off at 302, and the power ring limit is set to 12 at 304; thereafter, the 'DTMF holdoff' feature tests for a selected (e.g. 4-second) absence of DTMF activity at 317 before ringing the modem with a selected cadence at 308. If the PC power is on at 302, the ring limit is set to 8 at 306, and the line is tested for a 4-second absence of DTMF activity at 317 prior to ringing the modem with a selected cadence at 308. Thereafter, it is determined if the modem has answered at 310, which if true, leads to the cancelling of the ringing at 312 followed by enabling the 'ready' indicator to flash according to selected mode at 316 after an 'on-hook' line is detected at 314. After the 'ready' indicator is enabled, it is determined at 311 if the computer power was on at the start of the process; if so, the process returns to main processing loop of FIG. 5. If not, the 'power' indicator is flashed for 10 seconds after which the PC power is turned off at 300. If, at 310, the modem has not answered (gone 'off-hook'), the ringing of the modem at 308 is continued so long as the ring limit has not been reached at 313. If the ring limit has been reached and it is determined that this was the first attempt to ring through the modem, as determined at (320), the power is turned off and on again after a 4-second pause, the ring limit set to 12 and the ring procedure beginning with step 308 restarted. If it was not the first attempt to get the modem to answer (320), the 'ready' indicator is turned off at 322 and the process returns to the main processing loop of FIG. 5.

The interactive-mode DTMF password subroutine 90 of FIG. 8 responds to the detection of the interactive-mode DTMF password, step 294 of FIG. 6, whereupon a "greeting" tone sequence is sent to the initiating party and a load 113 placed on the line input to maintain an off-hook condition and relay 108 is energized so as to disconnect any device connected at jack 110, step 330. If a command has been entered at step 332 and it is determined to be valid at step 334, an "accept" tone sequence such as two notes of ascending pitch is placed on the telephone line at step 336. If a command has not been entered and more than 30 seconds have elapsed, step 334, the main processing loop is re-entered before step 262. If a command has been entered, at step 334 but is invalid, a "reject" tone sequence such as two notes of descending pitch is provided, step 340, and the 30-second command time-out interval timer is reset at step 342, prior to re-entering the command test at step 332. Once the "accept" tone sequence has been provided at step 336, the particular query of the initiating party is determined at step 344. If the query relates to the PC on/off status which is determined at step 346, a "true" tone sequence is returned to the initiating party via the telephone line at step 348 if the power is on, and a "false" tone sequence is returned to the initiating party if the power is off, step 350. Typically, the true tone sequence comprises a reference tone followed by a higher-pitched tone, while the false tone sequence comprises the same reference tone followed by a lower-pitched tone. Upon generation of the tone sequence, the command time-out is reset at step 342. If the received command is not a state query, a test is made at step 352 whether the initiating party intends to control the power of the remote computer 54. If so, the power unit 59 is energized or de-energized according to the received command and the power LED indicator is likewise turned on or off, step 354 and the 30-second command time out, 342, is reset. If the signal received is neither a power command or a query, the system according to the present invention provides a "ring-through" command which is detected at step 356 which causes the automatic-mode DTMF password subroutine 88 of FIG. 7 to begin. If the command is neither a ring-through command nor one of the previously discussed commands, the present system provides for additional commands.

For example, the present invention includes a provision to facilitate reprogramming of the control unit to be accomplished by entering a programming mode 358 through a selected programming password detected at step 357. This mode allows alteration of nominal program values such as "12 rings to the modem before giving up on the ready-to-receive test" as well as user definition of passwords and the particular sequence of actions taken when said selected passwords are recognized, such as waiting for on- or off-hook events to occur, pausing for selected time periods, and the issuing of control and phone-line-coupled audio signals. This is in contrast to the remote reprogramming of the control unit by modem as described below in reference to FIGS. 10A and 10B.

The line off-hook subroutine 92 of FIG. 9 services a line off-hook condition detected at step 266 of FIG. 5. The line in-use LED indicator is activated, step 360 and the system tests whether the input line is on-hook at step 362. If the input line is on-hook, the system re-enters the main processing loop before step 262. If the line is not on-hook, the status of the "ready" and "PC power" buttons is subsequently tested. If the "ready" button is down at step 364, the line in-use LED indicator is turned off and the "message waiting" flag is set to a false state, step 366, whereupon a test of the "ready" button is made at step 368. When the "ready" button is released, the line in-use LED indicator is reactivated at step 370 and the line-ringing subroutine 86 of FIG. 6 is begun. In this way, the test of the "ready" button at step 364 provides the operator with a means of forcing the processor 150 into that state reached when incoming line ringing is detected and the call is answered. If the "ready" button is not depressed at step 364, and the "PC power" button is not depressed at step 372, the system returns to the on-hook line test of step 362. If the "PC power" button is depressed at step 372 and the computer 54 power is on at step 374, the computer is turned off at step 376 and the state of the "PC power" button is tested at step 378, whereupon the line on-hook test is made at step 362 and, if the "PC power" button is up at step 378. If the computer 54 power is off, the power is turned on and the power LED indicator is energized at step 380.

If the modem is off-hook, step 268 of FIG. 5, the Modem Off-Hook process 94 according to the improvement of the present invention is shown in FIG. 10A is begun, wherein the 'line in use' and 'modem in use' indicators are turned on and relay is closed at 390; subsequently the modem is checked for on-hook condition at 392. If the modem is on-hook the process returns to the main processing loop 84 in FIG. 5; if not, the line is monitored for the DTMF escape sequence comprising a specific sequence of DTMF tones at 394. If the escape sequence is detected, the process transfers to the Modem Batch Commands process 90 of FIG. 10B. If no DTMF escape sequence is detected, the status of the 'power down' button is determined at 394; if it is down, the status of the PC power is determined next at 396. If the PC power is not on at 396, the "PC power" indicator is turned on, and if it is on, the PC power indicator is turned off at 400. Thereafter, the process waits until the 'power' button is up at 402. If either the power button is down at 394 or up at 402, the process again checks the on-hook status of the modem at 392 and proceeds as described above The Modem Batch Commands process according to one embodiment 90 of the improvement of the present invention is shown in FIG. 10B, wherein initially the modem relay is closed at 330 and the command timer is reset at 342 before the presence of an entered command is detected at 332, which if detected not to be valid at 334, will lead to the reset of the command timer at 342 and the continuation of the process from that point. If no command has been entered at 332, the process 90 loops until a command is entered at 332 or the command timer expires at 338 before returning to the main processing loop, 84. If the command is valid at 334 and the command is a power command as detected at 352, the PC power and the corresponding power indicator is switched accordingly at 354 before the process resets the 30-second command timer at 342 and continues from that point. If the command is not a power command at 352, but detected as a 'ring-through' command at 356, the Automatic Touch-Tone process 88 of FIG. 7 is begun. If, instead, it is a 'reprogram' command as detected at 357, new parameters are stored at 358, the command timer reset at 342 and the process continues as described above. If the command is an exit command as detected at 359, or if the command timer has expired at 338, the process returns to the main processing loop of FIG. 5. If the command is valid but not a power, ring through, reprogram or exit command, it is processed at 355; thereafter, the command timer is reset at 342 and the process continues from that point.

If the "ready" button is down, as determined by step 270 of FIG. 5, the ready-button-down subroutine 96 of FIG. 11 is begun wherein the flashing of the "ready" LED is cancelled at step 410, and the status of the "ready" button is provided at step 412, whereupon the program re-enters the main processing loop before step 262 if the "ready" button is up. If the "ready" button is not up and three seconds have not elapsed, the "ready" button-up test at step 412 continues; if more than three seconds have elapsed at step 414, a ready-to-receive test is begun which comprises steps numbered 416 through 436. This sequence of operations verifies the operability of the remote computer 54, circuits of the control unit 58, modem 55, all necessary electrical connections, and program steps 230, 232, and 233 diagrammed in FIG. 4 to work in concert to successfully execute step 234 of FIG. 4. Toward this end, if the remote computer 54 power is on at step 416, the remote computer power is turned off and a four-second pause is executed, at step 418. If the remote computer 54 power is not on, it is turned on and the ring limit nominally set to 12 rings, at step 420. The modem is signalled by a ring voltage 120 at step 422. It is then determined whether the modem has answered the ring signal, step 424, whereupon the in-use LED indicators are activated and the ringing signal is cancelled at step 426 if the modem has answered the ring signal. Thereafter, it is determined if the line is on-hook, step 428, whereupon the test is continued for three seconds at step 430. If more than three seconds has elapsed and the line is not on-hook, the "ready" LED indicator is energized at step 432 and the line is tested at step 434 to determine if it is on-hook. If the line is on-hook, the original power state (on or off) is restored at step 436 and the main processing loop is re-entered before step 262. If the modem has not answered (gone off-hook), 424, and the ringing limit has been reached at step 438, the "ready" LED indicator is set to off at step 440 and the original power state is restored at step 436. If, in the main processing loop 84, it has been determined that the "PC power" button is downs step 272, the power-button-down subroutine 98 of FIG. 12 is begun, wherein the status of the PC power is determined, step 450, and the embodiment remote computer is turned on and the power LED activated, step 452 if the remote computer 54 is not currently on. If the remote computer 54 is already on, it is turned off and the power LED indicator is deactivated, step 454. Thereafter, the status of the "PC power" button is determined, step 456 and the main processing loop 84 re-entered before step 262 when the "PC power" button is released.

The Protocol Timing shown in FIG. 13 describes the actions of the originating and answering parties for the original embodiment of the present invention as described in parent patent application Ser. No. 733,371, the further improvement according to the present invention is evident after the call is answered, wherein the improvement according to the present invention includes (after step 3 of FIG. 13) the step of monitoring for specific tone signalling such as DTMF activity. DTMF activity may comprise a DTMF password or a portion of a password or other signalling sequence. If the DTMF activity exceeds a predetermined threshold, the present invention includes the step of closing the load relay 113. The improvement comprising a 'hold-off' of the ring of the modem (to delay the carrier) would occur before the fifth step (wherein the control unit rings the modem).

An embodiment 68 of a further improvement of the present invention is shown in FIG. 14A wherein an electronic mail system for remote data transfer includes a 'repeater' for facilitating simplified access to a remote computer and enhancing attendant security as part of the protocol implementation. Accordingly, the computer 580 and the modem 582 associated therewith typically provide signalling through a 'repeater' 62, described in greater detail below, which repeater 62 includes tone detection, generation, and control circuitry responsive to the modem signals to repeat the appropriate access codes or augment the codes sent to the control unit 58 to gain access to the modem 55 via the telco 56.

The signalling sequence for the system 68 is shown in FIG. 14B, wherein the modem 582 goes off-hook and receives dial tone from the telco, at 521. The modem 582 begins dialing and the dial tone is terminated at 522. The telco provides ring-back for the ring signal voltage (destination) at 523. While the ring-back proceeds, the modem sends a security code comprising a sequence of DTMF tones at 524 which is recognized by the repeater 506 and which disconnects the modem 582 from the telco line and repeats the code on the telco line for a selected number of cycles, typically beginning before the control unit 58 of the destination answers the ringing at 525. When the destination control unit 58 detects a complete instance of the access code at 526, a ring voltage (or control signal if integrated with the modem) is applied to the far modem 55. Also at step 526, according to the present invention, a selected code repeat syntax allows for writing and recalling values from a table in the repeater data store. The control unit's 58 far rings are detected by the repeater 62 which terminates the repetitions at 527. The repeater 62 then reconnects the modem 582 to the telco lines 56 at 528 to enable the far rings to be heard in the modem 58 speaker. When the destination modem 55 answers and sends a carrier at 529, the modem 582 begins negotiations to establish a data link, 530.

The block diagram of the repeater 62 is shown in FIG. 15, wherein connection between the modem 582 and the telco line 56 is provided by a relay 516 which is controlled by a programmable processor 500 responsive to program control stored in a programmable memory therein. The DTMF signal from the modem 582 on signal path 554 is detected by a DTMF detector 502 which provides corresponding output signals to the processor 500. Similarly, the processor 500 provides signals to a call progress tone generator 504 which provides the call progress tones to the modem 582. The repeated DTMF control tones are provided by a DTMF generator 506 to the far control unit 58 under processor 500 control via the relay 516, which also conveys a DC load 508 to the telco line (under processor 500 control) to maintain the off-hook state. The modem 582 off-hook state is detected by off-hook detector 510 which provides a corresponding signal to the processor 500. The call progress tones from the telco 56 and control unit 58 are detected by a call progress detector 512.

The repeater signal processing 64 is shown in FIG. 16, wherein the variables are initialized and the modem relay closed at step 520 and the process waits until the modem goes off-hook at 524. If the code repeat syntax is detected at 526, the modem relay is opened at 528; if not, the process waits until the modem is not off-hook at 527 before restarting the routine by re-initializing the variables and closing the modem relay at 520. After the modem relay is opened at 528, the access code is sent at 530 and the call progress detector 512 monitors for far rings at 532. If far rings are heard, the modem relay is closed at 542; if not, the control unit monitors for a busy signal at 534. If no busy signal is heard at 534, the call progress detector 512 checks to see if the repetition limit is reached at 536. If the repetition is not reached at 536, the code is sent at 530 and continues as described above. If the repetition limit was reached at 536, the call progress detector 512 tests for far rings at 538; if far rings were heard, the modem relay is closed at 542. If no far rings were heard at 538, the unit sends a 5-second busy tone to the modem at 540 or if the busy signal is heard at 534, the modem relay is then closed at 552 and process is resumed at the earlier step of waiting for a modem off-hook at 527. After the modem relay is closed at 542, the control unit waits until the far rings stops at 544, and the 8-second timer is started at 546. The call progress detector 512 monitors for a carrier at 548, which if present, returns the routine to monitor for an off-hook modem at 527. If no carrier is heard at 548, the process waits until the timer expires at 550. When the time expires at 550, the process sends a 5-second busy to the modem at 540 and continues as described above.

The call progress detection process 66 (implicit in 202, 204, 206, 208 and 218 of FIG. 3) according to the improvement incorporating the repeater 62 is shown in FIG. 17, wherein the improved process according to the present invention provides the calling end more detailed information (data) about the status of the computer at the receiving end. The call progress detection begins by reading and saving the time of day preferably to within 1 second at step 560, dials the telephone number at 562, waits for the modem result code at 564, reading and saving time of day at 566 and checking to see if the result code is "busy" at 568. If the code does not read "busy", other result codes are processed at 576 and the process 570 ends. If the result code is "busy", the stored times of day are subtracted at 570; if determined to be greater than a selected time (e.g. 6 seconds) at 572, it is inferred that the busy signal was provided by the repeater, indicating that the called system is not ready, and this error is reported by the dialer at 578, and the process ends. If the difference in time of day is less than 6 seconds, it is determined that the called line was busy and to try again beginning at step 560 and continuing as described above.

According to a further improvement 72 of the present invention shown in FIG. 18, the modem (58) and the control unit (55) are integrated into a single unit, wherein the processor 590 provides signals from the signal detectors 586 and 588 to the computer interface 596 along the path 598 instead of through the ring voltage generator 592 and ring detector 594. Moreover, any general purpose output of the processor 590 can provide the logic level to the appropriate signal pin of the computer interface, such as the Ring Indicator [RI] pin of the RS-232C standard, so long as the electrical characteristics (e.g. voltage levels) of the processor are conditioned so as to be compatible with the computer interface.

Modifications and substitutions of the solely exemplary embodiment of the present invention, discussed in detail above as made by one of ordinary skill in the art, are considered to be within the scope of the present invention, which is not to be limited except by the claims which follow. Furthermore, the detailed implementation of the present invention, such as causing a particular signal to be created or processed in the described hardware in response to the command or program control illustrated by the above discussed program process steps or in the protocol diagram of FIG. 14A, can be provided by one of ordinary skill in the art.

What is claimed is:

1. A method of providing data transfer between a local computer and a remote computer, comprising the steps of:
    establishing communications between said local computer and a remote computer control unit;
    transmitting a selected signal to said remote computer control unit;
    providing a local ringing signal to said remote computer from said remote computer control unit after said selected signal is detected by said remote computer control unit;
    answering said local ringing signal;
    executing a selected program in said remote computer to service said communications between said local computer and said remote computer upon answer of local ringing signal;
    respectively sending a selected signal from said local computer after a carrier link is established and a prompt is issued by said remote computer; and
    providing a transfer of data between said local computer and said remote computer.

2. The method of claim 1, further including before the step of providing a local ringing signal, the step of
    providing power to said remote computer.

3. The method of claim 2, wherein the said selected signal comprises a selected DTMF signal.

4. The method of claim 3, further including the step of sending a repetition of said selected DTMF password.

5. The method of claim 4, wherein the step of sending comprises the step of sending said repetition from a repeater external to at least one of said local computer and a modem associated with said computer.

6. The method of claim 2, wherein the step of providing power to said remote computer comprises the step of providing power to said remote computer upon receipt of said selected password.

7. Apparatus comprising,
    a control signal tone decoder for receiving a tone encoded control signal from a source and for providing a decoded signal output therefrom;
    an audio tone detector receiving audio tone signals from a selected destination and for providing detected tone output signals in response to said received audio tone signals;
    a processor for selectively providing an output signal in response to said decoded signal output and said detected tone output signals; and
    a control signal generator for selectively sending control signals to said selected destination in response to said processor output signal.

8. The apparatus of claim 7, wherein said audio tone detector includes means for detecting ring-back signals.

9. The apparatus of claim 7, further comprising
    a switch for selectively connecting said source with said destination to provide a two-way flow of signals between said source and said destination.

10. The apparatus of claim 9, wherein said switch inhibits said control signal generator signals from said destination when said destination is connected to said source.

11. The apparatus of claim 9, wherein said switch is selectively controlled by said processor.

12. The apparatus of claim 7, wherein said control signals received by said processor comprises a format including a escape sequence, wherein said processor includes programmable means for selectively responding to said control signals in response to said escape sequence.

13. The apparatus of claim 7, wherein said processor includes
    program storage means including a stored program, said program storage means being selectively responsive to said control signal according to said escape sequence; and
    means for entering stored program data in response to said escape sequence,
        wherein said processor is operable according to program stored in said program storage means, and
        wherein said stored program data entered in response to said escape sequence is included in the control signal following said escape sequence.

14. The apparatus of claim 13, wherein said processor includes an access code generator responsive to said escape sequence for selectively generating a controller output signal in response to said escape sequence.

15. The apparatus of claim 7, wherein said processor comprises
    an access code detector for detecting and storing the transmission of an access code from said source; and
    an access code repeater for providing an output signal comprising a selectably repeating said access code.

16. For use with a computer having a data interface for selectively receiving data and control signals, apparatus for providing data transfer comprising:
    a modem for providing data transfer over a telephone line medium and corresponding signals to said computer data interface;
    means responsive to a telephone line ring signal for providing an answer mode after a selected number of rings and for providing a telephone line connection in said answer mode;
    means responsive to a repeatedly transmitted password signal from said telephone line communication for providing a control signal upon receipt of a selected password;
    means responsive to said control signal to provide a modem status signal to said computer in response to said control signal, wherein
        said computer becomes operable to receive data via said telephone line connections upon receipt of said modem status signal, and wherein
        said computer is adapted to provide local data and enable a data transfer upon receipt of a selected alphanumeric caller ID and password combination.

17. The apparatus of claim 16, wherein said means responsive further includes means for providing control signals to said computer data interface.

* * * * *